(12) United States Patent
Berstis

(10) Patent No.: US 6,198,996 B1
(45) Date of Patent: Mar. 6, 2001

(54) METHOD AND APPARATUS FOR SETTING AUTOMOTIVE PERFORMANCE TUNED PREFERENCES SET DIFFERENTLY BY A DRIVER

(75) Inventor: Viktors Berstis, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/239,339

(22) Filed: Jan. 28, 1999

(51) Int. Cl.[7] .............................. G06F 17/00; G06F 19/00
(52) U.S. Cl. ................. 701/36; 701/49; 713/200
(58) Field of Search .................. 701/36, 45, 49, 701/1; 307/10.1, 10.5; 713/200, 202; 340/825.31, 825.34

(56) References Cited

U.S. PATENT DOCUMENTS

| | | | |
|---|---|---|---|
| 3,878,915 | * 4/1975 | Purland et al. | 180/170 |
| 4,477,874 | * 10/1984 | Ikuta et al. | 701/49 |
| 4,754,255 | * 6/1988 | Sanders et al. | 340/64 |
| 5,459,304 | * 10/1995 | Eisenmann | 235/380 |
| 5,494,130 | * 2/1996 | Foster | 180/287 |
| 5,525,977 | * 6/1996 | Suman | 340/825.25 |
| 5,532,690 | * 7/1996 | Hertel | 340/989 |
| 5,630,159 | * 5/1997 | Zancho | 709/221 |
| 5,680,470 | * 10/1997 | Moussa et al. | 382/119 |
| 5,729,619 | * 3/1998 | Puma | 382/115 |
| 5,801,616 | * 9/1998 | Ghazarian et al. | 340/426 |
| 5,812,067 | * 9/1998 | Bergholz et al. | 340/825.31 |
| 5,825,283 | * 10/1998 | Camhi | 340/438 |
| 5,838,251 | * 11/1998 | Brinkmeyer et al. | 340/825.31 |
| 5,937,065 | * 8/1999 | Simon et al. | 380/9 |
| 6,009,363 | * 12/1999 | Beckert et al. | 701/33 |
| 6,029,102 | * 2/2000 | Elsman | 701/1 |
| 6,032,089 | * 2/2000 | Buckley | 701/36 |

* cited by examiner

Primary Examiner—Michael J. Zanelli
(74) Attorney, Agent, or Firm—Rudolph J. Buchel; Duke W. Yee; Jeffrey S. LaBaw

(57) ABSTRACT

An onboard computer is used to control many aspects of a vehicle including performance and ride characteristics. Used in combination with the onboard computer, a smart card key is used to authorize a user. In addition, the smart card key stores user preference data, such as performance and ride parameters, which are in turn used by the onboard computer to adjust performance and ride characteristics of the vehicle. Because the parameters are stored on individual smart card keys, each operator of the vehicle stores user parameters specific to each user. User parameters may also be stored in the computer memory itself. Access to the user preference data is controlled by user identification parameters that are also stored on a smart card memory or in the memory of the computer. These user identification parameters may include, for example, user identification by a combination of means including a password, finger print, eye print and/or voice print or other biologic attributes unique to the user.

34 Claims, 11 Drawing Sheets

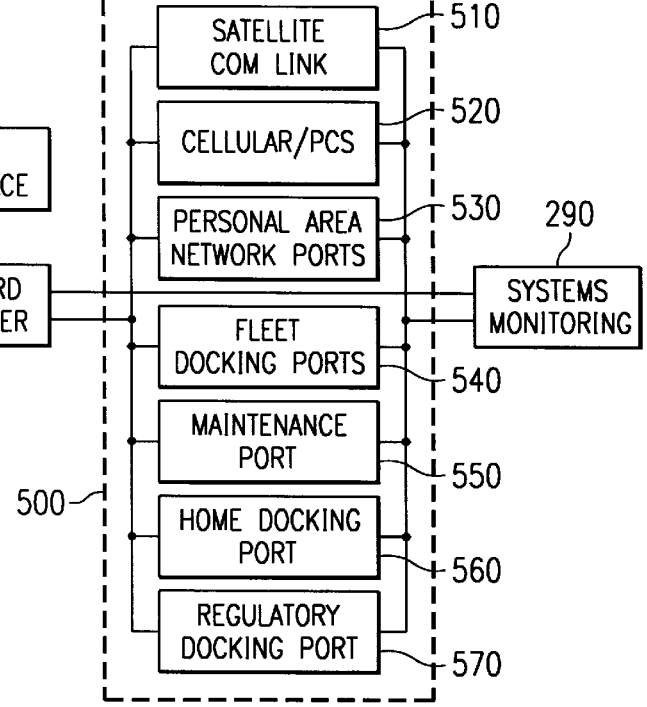
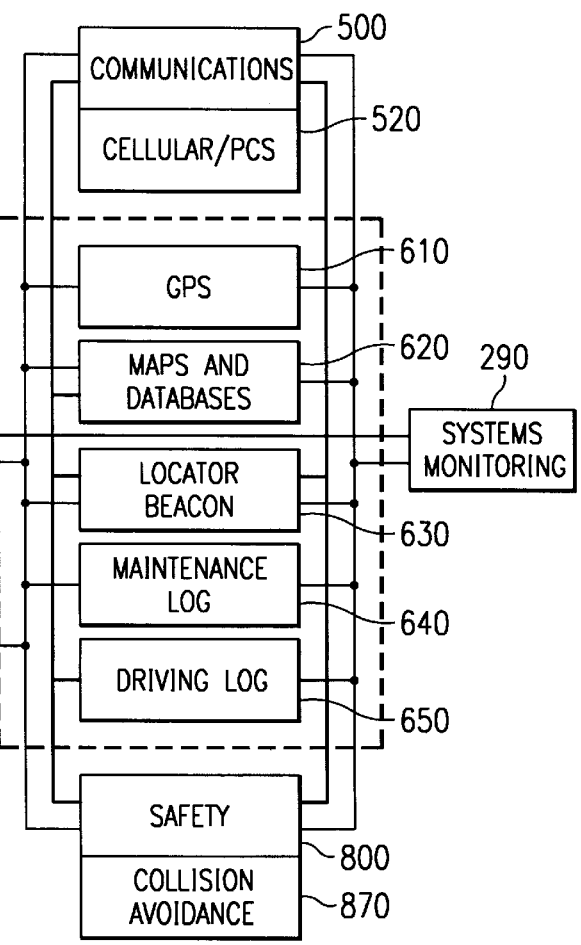
FIG. 5
FIG. 6

FIG. 14 1400

| USER RECORD |
|---|
| USER ID |
| VERIFICATION |
| SECURITY LEVEL |
| PREFERENCES |
| PREFERENCE LIMITS |
| USER LOGGED DATA |

FIG. 15 1500

| USER ID |
|---|
| NAME |
| NUMBER |

FIG. 16 1600

| VERIFICATION |
|---|
| PASSWORD |
| ALGORITHMIC PASSWORD |
| SMARTCARD |
| FINGER PRINT |
| EYE PRINT |
| VOICE PRINT |
| BY PROXY VIA MASTER USER OR ADMINISTRATOR |

FIG. 17 1700

| SECURITY LEVEL |
|---|
| NORMAL USER |
| MASTER |
| ADMINISTRATOR |
| SERVICE CENTER |
| PARKING ATTENDANT |
| SEMI-USER |
| THIEF |
| DRUNK DRIVER |

FIG. 18 1800

| PREFERENCES |
|---|
| SEAT ADJUSTMENTS |
| TEMPERATURE ADJUSTMENTS |
| RADIO/ENTERTAINMENT SYSTEM ADJUSTMENTS |
| TELEPHONE NUMBER SETTING |
| RIDE |
| ACCELERATION |
| WARNING MESSAGE PREFERENCE |
| AIRBAG SETTINGS |

| PREFERENCE LIMITS |
|---|
| MAXIMUM ENGINE RPMs |
| MAXIMUM FORWARD ACCELERATION |
| MAXIMUM SPEED |
| MAXIMUM RIDE STIFFNESS |
| MAXIMUM DISTANCE FROM HOME PORT |
| MAXIMUM DISTANCE FROM STORED ROUTES |
| MAXIMUM DISTANCE FROM STORED DESTINATION |
| CASH ACCOUNT BALANCE FOR FUEL |
| CASH LIMIT FOR FUEL PER UNIT OF TIME |
| CASH ACCOUNT BALANCE FOR MAINTENANCE |
| NIGHT DRIVING LIMITS |
| HOURS OF OPERATION LIMITS |
| SOBRIETY TEST REQUIREMENT |
| THEFT RESPONSE |
| SEATBELT RESTRICTIONS |
| AIRBAG SETTINGS |
| CASH ACCOUNT BALANCE FOR SERVICES |
| MAXIMUM AUDIO SOUND LEVEL |
| ANTILOCK BRAKE SETTINGS |
| TRACTION CONTROL SETTINGS |

*FIG. 19* 1900

| USER LOGGED DATA |
|---|
| HOURS OF ENGINE TIME |
| HOURS LOGGED IN |
| MILES TRAVELED |
| CASH CONSUMED |
| AVERAGE MPG |
| MAXIMUM SPEED |
| AVERAGE SPEED |
| MAXIMUM ACCELERATION |
| MAXIMUM ENGINE RPM |
| ANTILOCK BRAKE ENGAGEMENT |
| TRACTION CONTROL ENGAGEMENT |
| AIRBAG DEPLOYMENT |
| MAXIMUM DISTANCE FROM HOME |
| MAXIMUM DISTANCE FROM ROUTE |
| MAXIMUM DISTANCE FROM DESTINATION |
| GPS TRIP TRACKING |
| SERVICES USED |

*FIG. 20* 2000

METHOD AND APPARATUS FOR SETTING AUTOMOTIVE PERFORMANCE TUNED PREFERENCES SET DIFFERENTLY BY A DRIVER

BACKGROUND OF THE INVENTION

1. Technical Field

The present invention relates to a vehicle onboard computer system that controls various vehicle onboard systems and subsystems. More specifically, the present invention relates to a system and method for implementing user-specific preferences on the vehicle onboard computer system for regulating the operation of vehicle onboard systems. Still more particularly, the present invention relates to a system and method for identifying and authorizing users and implementing user-specific parameters associated with the users.

2. Description of Related Art

It has been well known in prior art to limit the access and operation of a vehicle by granting authority of the user to operate a vehicle with such devices as a mechanical key. In the prior art, any person who obtained the mechanical key could generally operate the vehicle. Other systems require verification by such methods as inputting a password or personal identification number, in addition to or in place of using a mechanical key.

As the sophistication and comfort of the vehicles increased, the number of vehicle systems and subsystems increased proportionally. With each system and subsystem, the user was required to make a number of adjustments to the individual systems for the user to gain the maximum benefit from that system. Generally, when the user entered the vehicle subsequent to operation by another user, each one of these setting would have to be readjusted for the vehicle to be operated. Initially, most of these settings were adjusted manually. As the complexity of systems and subsystems advanced more an more, the systems could be adjusted remotely from a central location. However, prior systems still were unable to index the adjustments made to the different subsystems with a specific user. Still more crucial to the safe operation of a vehicle, there was no reliable method for identifying an authorized user or even distinguishing one user from another. Therefore, it would be advantageous to have an improved method and apparatus for adjusting preferences in a vehicle.

SUMMARY OF THE INVENTION

An onboard computer is used to control many aspects of a vehicle including performance and ride characteristics. Used in combination with the onboard computer, a smart card key is used to authorize a user. In addition, the smart card key stores user preference data, such as performance and ride parameters, which are in turn used by the onboard computer to adjust performance and ride characteristics of the vehicle. Because the parameters are stored on individual smart card keys, each operator of the vehicle stores user parameters specific to each user. User parameters may also be stored in the computer memory itself. Access to the user preference data is controlled by user identification parameters that are also stored on a smart card memory or in the memory of the computer. These user identification parameters may include, for example, user identification by a combination of means including a password, finger print, eye print and/or voice print or other biologic attributes unique to the user.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 illustrates another system under the control of the onboard computer, the communications interface system.

FIG. 6 illustrates another system under the control of the onboard computer, the navigation and tracking system.

FIG. 14 illustrate the data structure stored in memory of the present invention.

FIG. 15 illustrates the user ID data structure.

FIG, 16 illustrates the verification data structure.

FIG. 17 illustrates the security level data structure.

FIG. 18 illustrates an extremely abbreviated data structure of possible preferences.

FIG. 19 illustrates the preference limits data structure.

FIG. 20 illustrates the data structure of user logged data.

Figure 21:
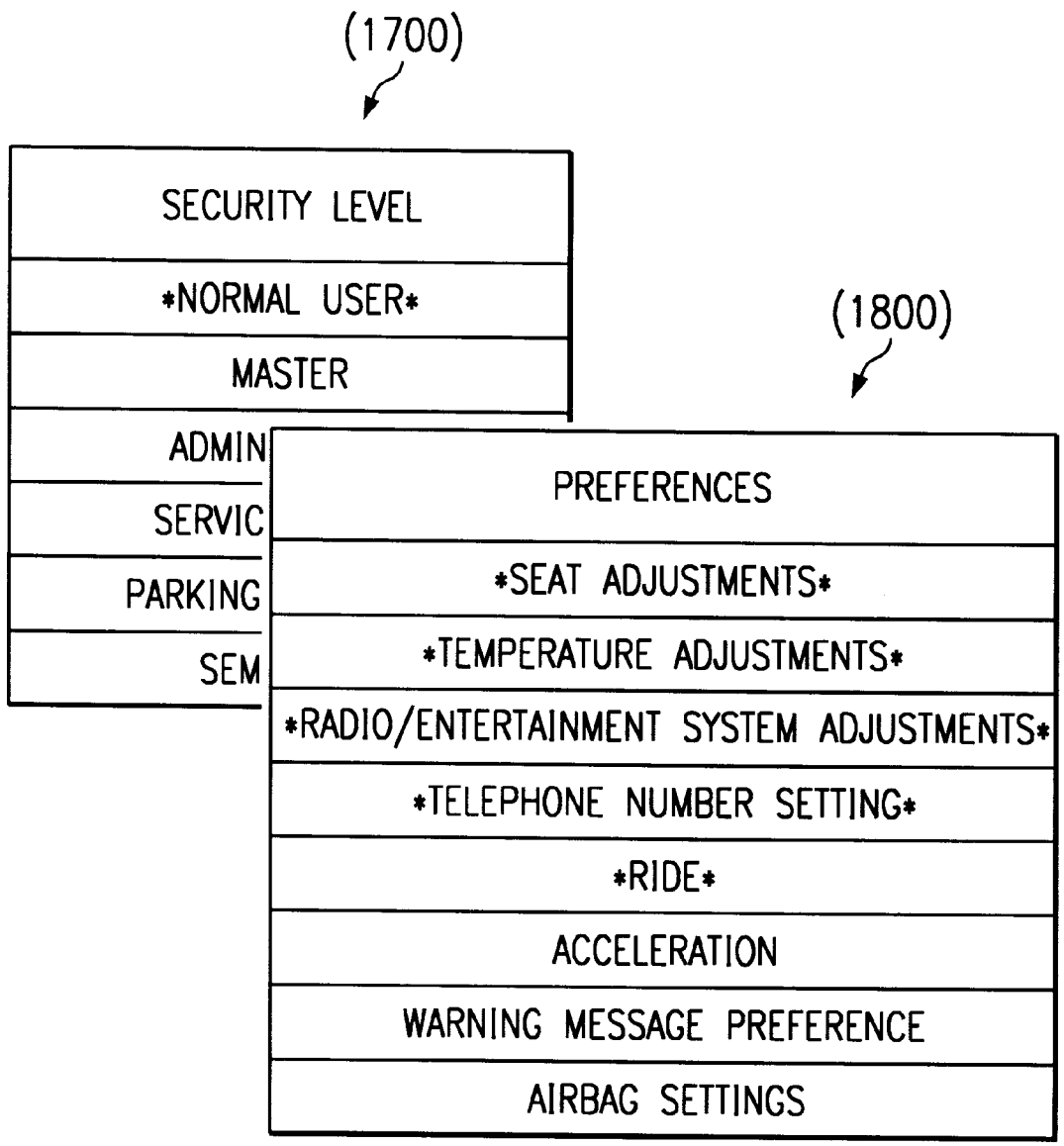

FIG. 21 illustrates an example of how the onboard computer authorizes user preferences by user security level.

DETAILED DESCRIPTION OF THE PREFERRED EMBODIMENT

The present invention provides for a method and means for implementing user specific preferences to onboard systems on a vehicle. Heretofore user specific preferences were unknown because the onboard systems could not discriminate between users' identities but would instead discriminate between access keys, either mechanical or personal identification numbers. The present invention incorporates user verification for positively verifying the user and indexing user specific preferences to that user whereby the user need not make adjustments to the various onboard systems each time the user accesses the vehicle. The present invention is described herein with reference to a preferred embodiment of the onboard systems (FIGS. 1 to 10), a process for practicing the present invention implemented on the onboard system (FIGS. 11 to 13) and finally, with respect to an embodiment of a data structure used in conjunction with the process (FIGS. 14 to 21).

Figure 1:
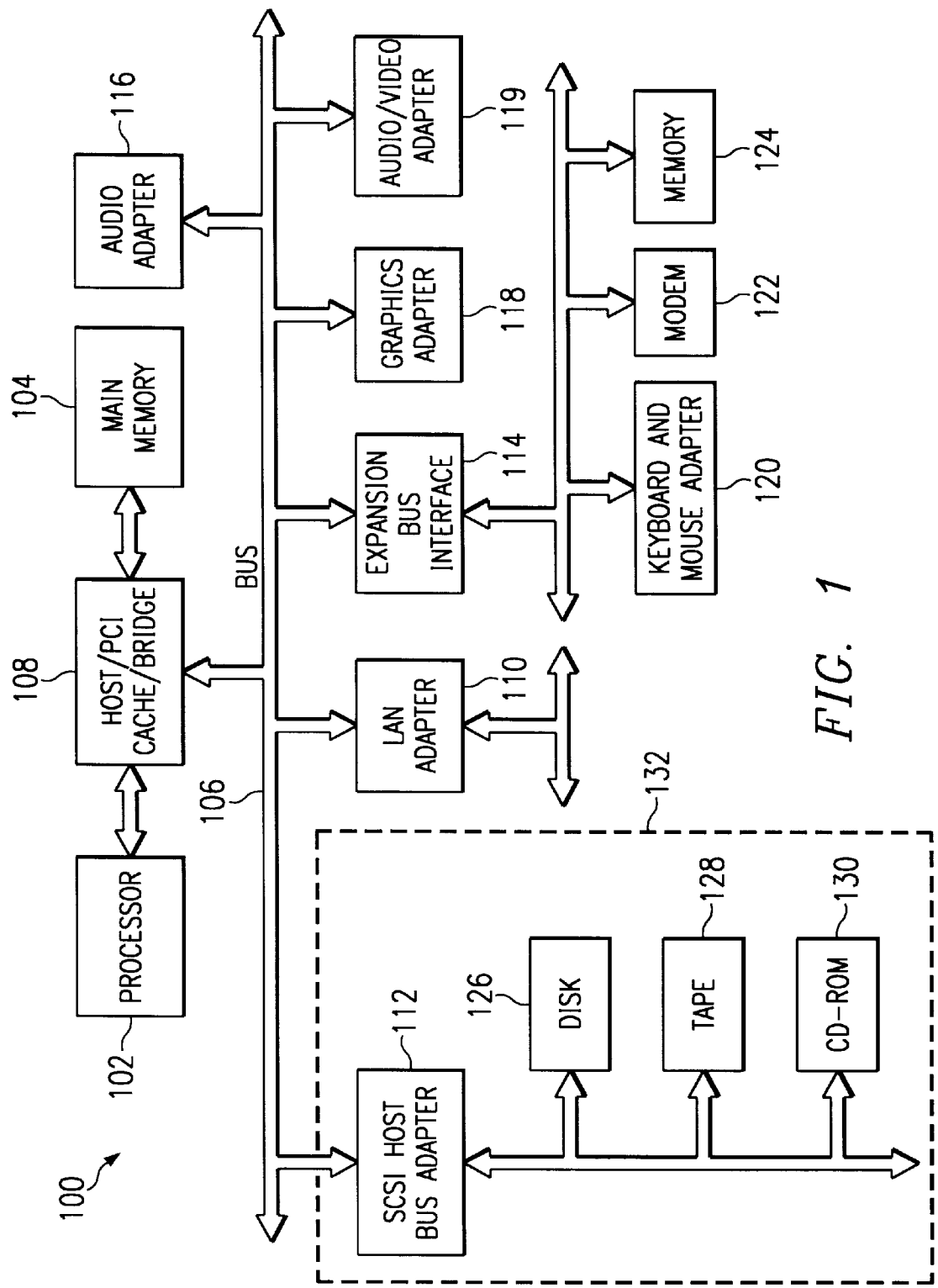
FIG. 1 depicts a block diagram illustrating a data processing system of the present invention.

With reference now to FIG. 1, a block diagram illustrates a data processing system in which the present invention may be implemented. Data Processing system 100 is an example of a client computer. Data Processing system 100 employs a peripheral component interconnect (PCI) local bus architecture. Although the depicted example employs a PCI bus, other bus architectures such as Micro Channel and ISA may be used. Processor 102 and Main Memory 104 are connected to PCI local Bus 106 through Host/PCI Cache/Bridge 108. Host/PCI Cache/Bridge 108 also may include an integrated memory controller and cache memory for Processor 102. Additional connections to PCI local Bus 106 may be made through direct component interconnection or through add-in boards. In the depicted example, Local Area Network (LAN) Adapter 110, SCSI Host Bus Adapter 112, and Expansion Bus Interface 114 are connected to PCI local Bus 106 by direct component connection. In contrast, Audio Adapter 116, Graphics Adapter 118, and Audio/Video Adapter (A/V) 119 are connected to PCI local Bus 106 by add-in boards inserted into expansion slots. Expansion Bus Interface 114 provides a connection for a Keyboard and Mouse Adapter 120, Modem 122, and additional Memory 124. Additional Memory 124 may consist of any type of memory including flash memory. SCSI Host Bus Adapter 112 provides a connection for hard Disk drive 126, Tape drive 128, and CD-ROM drive 130. Typical PCI local bus implementations will support three or four PCI expansion slots or add-in connectors.

An operating system runs on Processor 102 and is used to coordinate and provide control of various components within Data Processing system 100 in FIG. 1. The operating system may be a commercially available operating system such as OS/2, which is available from International Business Machines Corporation. "OS/2" is a trademark of International Business Machines Corporation. The operating system may be a real time operating system (RTOS), such as QNX Neutrino™ from QNX Software Systems Ltd., 175 Terranence Matthews Crescent, Kanata, Ontario, Canada K2MLW8. An object oriented programming system such as Java may run in conjunction with the operating system and provide calls to the operating system from Java programs or applications executing on Data Processing system 100 via a Java Virtual Machine. "Java" is a trademark of Sun Microsystems, Inc. Instructions for the operating system, the object-oriented operating system, and applications or programs are located on storage devices, such as hard Disk drive 126, and may be loaded into Main Memory 104 for execution by Processor 102.

Those of ordinary skill in the art will appreciate that the hardware in FIG. 1 may vary depending on the implementation. Other internal hardware or peripheral devices, such as flash ROM (or equivalent nonvolatile memory) or optical disk drives and the like, may be used in addition to or in place of the hardware depicted in FIG. 1. Also, the processes of the present invention may be applied to a multiprocessor data processing system.

For example, Data Processing system 100, if optionally configured as a network computer, may not include SCSI Host Bus Adapter 112, hard Disk drive 126, Tape drive 128, and CD-ROM 130, as noted by dotted line 132 in FIG. 1 denoting optional inclusion. In that case, the computer, to be properly called a client computer, must include some type of network communication interface, such as LAN Adapter 110, Modem 122, or the like. For mobile vehicle applications, the preferred network communication interface might be a wireless network circuit for communicating digital packets of information to and from the central fleet server. As another example, Data Processing system 100 may be a stand-alone system configured to be bootable without relying on some type of network communication interface, whether or not Data Processing system 100 comprises some type of network communication interface. As a further example, Data Processing system 100 may be a Personal Digital Assistant (PDA) device which is configured with ROM and/or flash ROM in order to provide non-volatile memory for storing operating system files and/or user-generated data.

The depicted example in FIG. 1 and above-described examples are not meant to imply architectural limitations with respect to the present invention. Although FIG. 1 provides examples of configurations of computer systems on which the present invention may execute, the following background information may provide a context for understanding the overall computing environment in which the present invention may be used.

Figure 2:
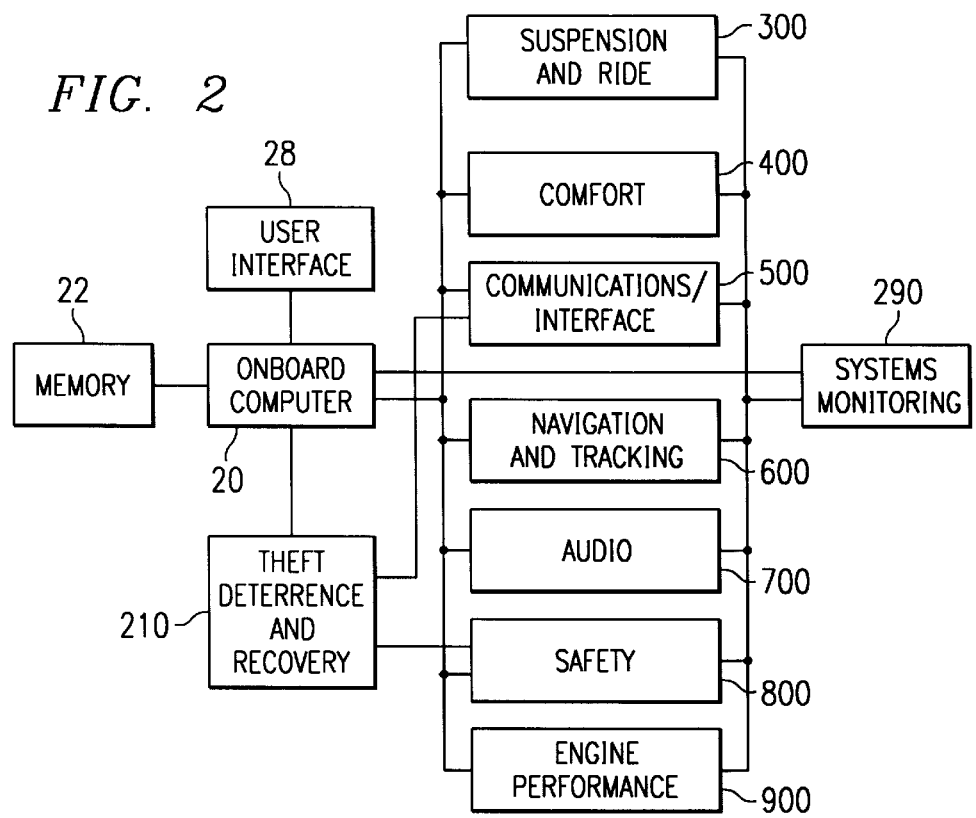
FIG. 2 depicts the onboard systems of the present invention as defined in a preferred embodiment of the present invention.

FIG. 2 describes the systems of the present invention as defined in a preferred embodiment of the present invention. In the present invention, the vehicle may contain one or more Onboard Computer(s) 20. Users control different systems within the vehicle through Onboard computer 20. A specific user can only gain as much control of a system or subsystem as authorized by Onboard Computer 20. A user may fall into one or more security levels(s), for instance, low level security, master level security, administrator, service attendant, parking attendant or semi-user. The varying levels of security allow users having different access priorities to access only the systems authorized by the level of security that corresponds to the user's security level. Other, more specialized security levels might also be available for special purpose operation of the vehicle, such as thief and drunk driver levels which severely limit access and performance of the vehicle.

Implementing the different security levels is primarily a software function which authorizes security levels in a series of IF tests in a logic flow. This software function is an extremely effective means of implementing security levels because the preferred embodiment consists of a closed system which is protected from arbitrary software being installed from unknown sources. Alternatively, each security level could be a separate level of hardware. Onboard Computer 20 also contains an onboard computer Memory 22 which would store the software logic described above. Onboard Computer system 20 is intended to be exemplary in nature, and it is not intended in any way to restrict the implementation of this invention.

In one embodiment of this invention, Onboard Computer 20 controls several onboard systems through its different security levels. For simplicity, the invention is described largely as consisting of two security levels, low and high, corresponding to two different levels of user security. One feature of this invention is that accessing and changing preferences relating to any one of these systems can be done only by the user who has a corresponding security level for the security level which controls the specific system.

Taking first the lower level security, a low level security user may access and change preference settings for one or more of the following onboard systems: Suspension and Ride system 300; Comfort system 400; communications/Interface system 500; Navigation and Tracking system 600; Audio system 700; and Systems Monitoring system 290 for the above-mentioned onboard systems.

A user possessing a higher security level, such as a master security level as authorized by Onboard computer 20, in addition to resetting and adjusting the preference settings for the systems requiring a lower level security level for access, may also adjust the preference settings of the systems requiring a higher level of security for authorization. Higher level security authorization is required for: Safety system 800; Engine Performance system 900; and Theft Deterrence and Recovery system 210.

Figure 3:
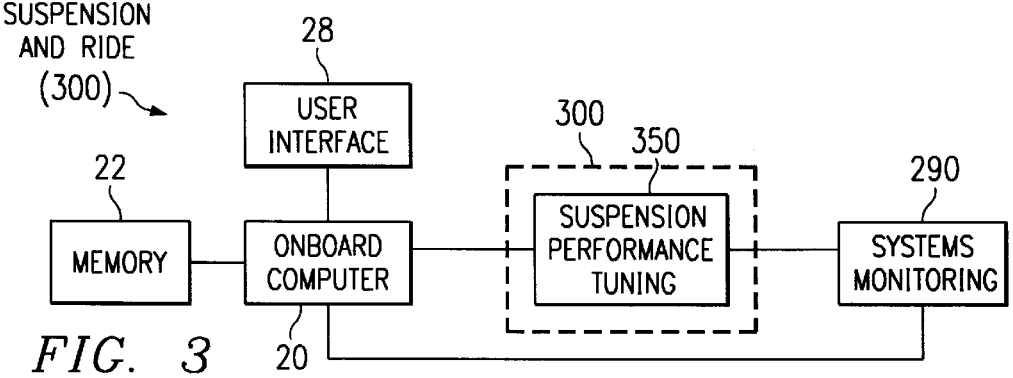
FIG. 3 depicts the suspension and ride system of the vehicle.

FIG. 3 depicts the suspension and ride system of the vehicle. The dashed line around the subsystems depicts which functions are controlled by the system. Suspension and Ride system 300 and associated subsystems are controlled by preferences which set functions associated with the particular subsystems. Suspension and Ride system 300 includes Suspension Performance Tuning 350. By the user specifying suspension performance tuning parameters, the vehicle's ride attributes, such as pitch, yaw, roll and stiffness, can be changed.

As the user is identified through the use of a user ID via User Interface 28, Onboard Computer 20 extracts certain performance settings from onboard Memory 22 which are indexed to the user's name or ID number. These performance settings include user specific parameters which are used to modify each of the functions described above. One example is that a user may prefer a stiffer ride and may prefer a certain feel when he operates the vehicle. Therefore, the user may select certain parameters having to do with suspension performance tuning to affect the vehicle's ride. These parameters adjust each one of the functions mentioned above associated with the subsystem in order to give that user the ride which he desires.

Systems Monitoring 290 continually monitors pitch, yaw, roll and stiffness attributes of the vehicle's ride and transmits the information to Onboard Computer system 20. In another embodiment of this invention, Systems Monitoring system 290 continually updates the suspension performance tuning in order to maintain that overall riding effect desired by the user. Therefore, as suspension and ride parts such as tires, shocks, struts, springs and bearings wear, Systems Monitoring system 290 monitors each one of the functions for the desired effect. If the results monitored by Systems Monitoring system 210 are not within the user's set preference, Onboard computer system 20 may attempt to adjust each one of the functions automatically in an attempt to adjust the ride to the user's desired preferences—in other words, reset the user specified ride parameters automatically.

In another embodiment, the user merely sets parameters associated with suspension performance tuning, and Systems Monitoring system 290 merely monitors the functions and transfers the functional output to Onboard Computer 20. In this embodiment, it is left up to the user to manually set each one of the ride and suspension parameters, and as the parts of the vehicle change with respect to wear or damage, the user is expected to manually update each one of the parameters. Although this is possible, it is unlikely that the ordinary user would possess the skill necessary to make those adjustments autonomously, thus requiring Onboard Computer 20 to calculate those functional parameters for the user. Therefore, while expert drivers such as race car drivers, mechanics and the like may possess the knowledge needed to adjust these parameters, the ordinary weekend vehicle operator might rely on a routine stored within Onboard Computer 20 to make those adjustments.

Figure 4:
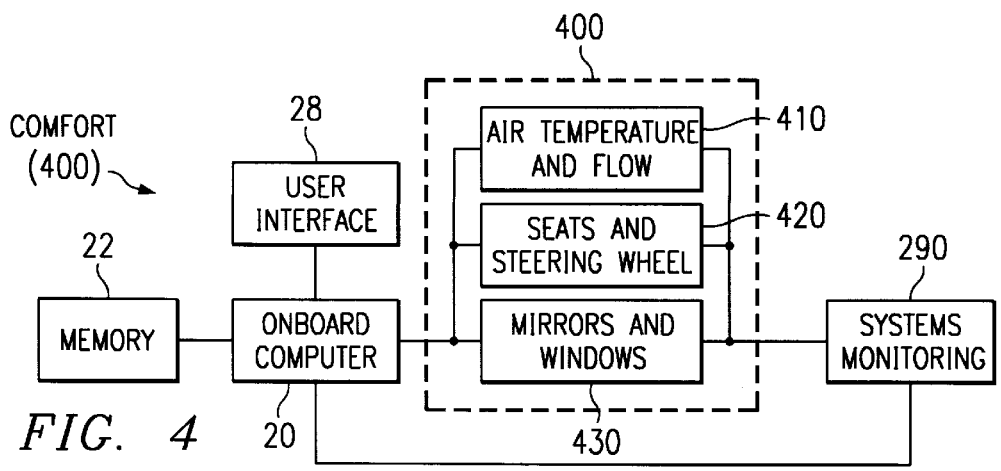
FIG. 4 illustrates the comfort system of the vehicle.

FIG. 4 illustrates another system under the control of every user, the Comfort system 400. Comfort system 400 includes: Air Temperature and Flow subsystem 410; Seats and Steering Wheel subsystem 420; and Mirrors and Windows subsystem 430. Once the user has ben identified by Onboard Computer 20 via User Interface 28, Onboard Computer 20 retrieves user specific parameters from system Memory 22. Those user specific parameters are used to adjust the various subsystems of Comfort system 400. If a user enjoys the air temperature somewhat lower and the flow higher than other users, as the user is identified by Onboard Computer 20, Air Temperature and Flow subsystem 410 are automatically adjusted to the user specific parameters stored in Memory 22. Therefore, the user would not have to readjust the air temperature and flow parameters every time the user enters the car, but rather merely satisfy identification to Onboard Computer 20, and Onboard Computer 20 would retrieve the user's specific user parameters from Memory 22 and adjust Comfort system 400 accordingly.

In the depicted example, other conveniences controlled by Comfort system 400 include adjusting seats and steering wheel position, and mirrors and windows for particular users. As the user's height and proportions tend to change from user to user, it would be advantageous for each user to preset such settings as the seat position setting and the steering wheel position, along with mirror positions and window positions for the individual user. As the user drives the vehicle, and climate conditions or tastes change, the user may have occasion to adjust certain of the above-mentioned subsystems. As the user adjusts the subsystems, Systems Monitoring system 290 notes these adjustments and transmits the adjustments to Onboard Computer 20. Onboard Computer 20 then may store the adjustments to system Memory 22. On exiting the vehicle, the user need not reset the various user parameters that were initially stored in Memory 22, as these have been updated while the user operated the vehicle.

In one embodiment, Onboard Computer 20 merely retains the updated user specific parameters within Memory 22 as the user exits the vehicle, retrieving them again as the user specific parameters when the user is again identified to Onboard Computer 20. In another embodiment, updates fed to Onboard Computer 20 via Systems Monitoring system 290 are merely transient. In that embodiment, the updates are lost once the user exits the vehicle unless the user takes some affirmative action to save them. In that embodiment, once the user exits the vehicle the updated parameters are lost in lieu of the initial user specific parameters.

FIG. 5 illustrates another system under the control of the onboard computer, the communications and interface system. Another system that may be under the control of lower level security users is Communications/Interface 500. In a fully integrated onboard computer system, the ability to access large amounts of data for the convenience and safety of the operator becomes more and more important. Also, as the complexity of vehicles increases, the maintenance of those vehicles is expedited by allowing access to Onboard Computer 20 and the various systems through a specialized maintenance interface.

One embodiment of the present invention, Communications/Interface system 500, consists of various subsystems as fulfill the various above-mentioned needs. These include: Satellite Com Line 510; Cellular/PCS communications 520; Personal Area Network Port 530; Fleet Docking Port 540; Maintenance Port 550; Home Docking Port 560; and Regulatory Docking Port 570. Depending upon the intended use of the vehicle, some or all of these communications subsystems may be eliminated or substituted with other types of communications subsystems.

Other subsystems, such as Satellite Com Link 510 and Cellular/PCS communications 520 may contain extensive local memories for holding user specific data like earth link addresses and telephone numbers. Alternatively, earth link addresses and telephone numbers may be stored on a personal memory such as a SmartCard or magnetic swipe card, or in system Memory 22, and indexed by user.

In one example of the communications subsystems, for instance a fleet vehicle operation, vehicles could be continually tracked via Satellite Com Link 510. The fleet dispatcher, therefore, could watch the progress of vehicles and goods from the origin to the destination. If the dispatcher detects a delay somewhere along the route, the dispatcher could immediately contact the vehicle through Cellular/PCS 520 link or Satellite Com Link 510 to ascertain the problem and try to help the vehicle operator formulate an alternate route.

Personal Area Network (PAN) Port 530 would be useful for such things as ascertaining if a vehicle is authorized to, for instance, go through a toll booth. There, Onboard Computer 20 would automatically link with a computer at the toll booth via Personal Area Network Port 530 and communicate to the toll booth computer an electronic cash account number by which the toll computer could access and debit the cash amount of the toll, thereby eliminating the need for the driver of the vehicle to stop the vehicle and pay a toll. This would also eliminate the need for the driver to carry any cash while enroute; and in fact, the vehicle itself may not ever need to have the cash account, as it could merely link to the home or fleet headquarters and debit a financial account for the cash.

Another interface particularly helpful in fleet operation is a Fleet Docking Port 540. Although in the preferred embodiment, Fleet Docking Port 540 is a specific hardware port, fleet docking may also be realized by using the wireless network circuit described above in reference to FIG. 1. Fleet Docking Port 540 would be useful for an operation that tracks several vehicles up to several thousand vehicles. As the vehicle would enter the home terminal, the vehicle could park for transfer of cargo or maintenance, or whatever, and then be linked via Fleet Docking Port 540 to the terminal computer which in turn would be linked to the main operational computer. Thus, as the truck receives maintenance, or on or off loads cargo, the information concerning the prior trip could be downloaded from Onboard Computer 20 Memory 22, and information pertaining to the next scheduled trip, including maps, itinerary, electronic cash and the like, could be loaded onto Onboard Computer 20 Memory 22. Vehicle operators could also be authorized and de-authorized for the vehicle.

As noted above, detailed maintenance records are also important, especially as the number of vehicles in a fleet operation increases. Therefore, a specific Maintenance Port 550 would be useful. Maintenance Port 550 would provide instant access to certain files or records and allow for testing of onboard systems simultaneously with other fleet interface operations. While Maintenance Port 550 indicates that, primarily, the access is limited to maintenance of the engine and onboard systems and subsystems, Maintenance Port 550 should also have access to Onboard Computer 20 main Memory 22 to ascertain such things as fuel and mileage logs, distances traveled, environments traveled in and the like. In this way, an expert mechanic could determine the overall maintenance condition of the unit by comparing it to its previous performance.

Home Docking Port 560 would also be useful in a fleet operation where the vehicle operator may be required to bring the vehicle home. In that case, the vehicle operator would merely dock the vehicle at the home port and, using the user's home computer, the fleet operations could interface with the computer, for instance while the operator was away or asleep or on another task. In this way, Memory 22 in Onboard Computer 20 could be uploaded with pertinent information about an upcoming trip.

FIG. 6 illustrates another system under the control of the onboard computer, the navigation and tracking system. Another important onboard system is Navigation and Tracking system 600. A typical Navigation and Tracking system 600 may include GPS 610 for ascertaining the exact vehicle position via geosynchronous positioned satellites. Maps and Databases 620 would probably reside in the system Memory 22. Maps and Databases 620 might also be fairly transient, being uploaded and downloaded as the intended route of the vehicle changes. In another aspect of the invention, Maps and Databases 620 may be downloaded via Satellite Com Link 510 or Cellular/PCS 520 connection to the vehicle's home terminal.

Navigation and Tracking system 600 may also include Locator Beacon 630. While Locator Beacon 630 could take many forms and work in cooperation with one of the communication systems, either Satellite Com Link 510 or Cellular/PCS 520, Locator Beacon 630 may be a separate subsystem providing a radio frequency beacon used to locate the vehicle in case of emergency or possibly to track vehicle movements within a local area for a fleet dispatcher.

Another important set of tracking databases might be Maintenance Log 640 and Driving Log 650, which are somewhat related. For an expert mechanic to properly maintain a vehicle, it is useful to have within the vehicle's Maintenance Log 640 the prior routes and conditions in which that vehicle was driven. In that way, when the vehicle experiences what appears to be a sudden loss in performance over the last few trips, a master mechanic can examine the log to note if any difference in the driving pattern exists. Along that same vein, Driving Log 650 could also be useful to a master mechanic in examining the actual driving performance of the vehicle driver. Therefore, by carefully examining these two logs, a master mechanic might merely conclude that what appears to be poor vehicle and engine performance can merely be attributed to the change in drivers, driving patterns or routes.

Additionally, Driving Log 640 and Maintenance Log 650 can be used together to assemble data in User Logged Data 2000, FIG. 20. User logged data is indexed by user and might contain fields such as the operation of the vehicle, a specific trip and other data. The log could be displayed on User Interface 28 or at the user's home terminal by a user having an administrator security level. User Logged Data 2000 is an extremely useful resource for setting preference limits as shown on data structure 1900, FIG. 19.

With User Logged Data 2000, the performance of each user under a specific security level can be monitored by analyzing User Logged Data 2000, and specific preferences can be set for that user. For instance, if a suer appears to be prone to extremely fast accelerations, an administrator examining the Maximum Acceleration field of User Logged Data 2000, may limit that user. The administrator can limit vehicle acceleration to a more moderate rate by changing 5 feet per second$^2$ to 3.5 feet per second$^2$ in the Maximum Forward Acceleration field of Performance Limits data structure 1900.

Working in close association with Navigation and Tracking system 600 would be Communications/Interface system 500 and especially Cellular/PCS subsystem 520. Additionally, Theft Deterrence and Recovery system 210 and Collision Avoidance subsystem 870 of Safety system 800 could also make extensive use of Navigation and Tracking system 600.

In one example, if a vehicle is identified as being stolen or being used in an unauthorized manner, the vehicle can automatically ascertain its position via use of GPS subsystem 610 and Maps and Databases subsystem 620. Onboard Computer 20 could then use Communications/Interface system 500 to transmit the information through either Cellular/PCS subsystem 520 or Satellite Com Link subsystem 510 to the fleet dispatcher or local authorities. Additionally, one it has been positively confirmed that the vehicle has been stolen, Locator Beacon 630 could be turned on to aid the police in determining the location of the vehicle.

Another important feature of this invention, Safety system 800, including Collision Avoidance subsystem 870, would make extensive use of Maps and Databases 620 and GPS 610 subsystems in the event of an accident. For instance, Collision Avoidance subsystem 870 might, through some combination of events, detect that an accident that is likely to cause injury or death is imminent. In that case, rather than waiting for the accident to actually occur, Onboard Computer 20, using one of Communications/Interface 500 subsystems, either Cellular/PCS 520 or Satellite Com Link 510, can place an emergency call to the fleet dispatcher, to the vehicle's home or possibly to the local authorities, such as a 911 emergency call. In that way, once the accident actually occurs and the vehicle becomes inoperable, including Onboard Computer 20, a distress signal has already been issued by Onboard Computer 20. If, on the other hand, the accident which was determined by Onboard Computer 20 to be imminent does not occur, or the severity of the accident is limited, the user may merely cancel the imminent distress call.

Of course, under ordinary use, vehicles tend to break down or have mechanical difficulties of one type or another; and somehow, the likelihood is that, when that occurs, the vehicle operator will not have a clear idea of the vehicle's location within a particular driving area. By using the integrated Navigation and Tracking system 600, the vehicle operator can quickly determine the vehicle's location at the time of the incident and, using Communications/Interface system 500, call either a dispatcher, mechanic or a service company for aide.

In other embodiments, performance limits may be adjusted to limit the maximum distance a vehicle is authorized to travel from its home base or in deviation from a predetermined route of travel. Working in combination with Safety system 800 and Engine Performance system 900, Warnings, Gauges and Lights subsystem 830 uses visual or audio indicators to gently remind the vehicle operator that the limits of travel are being exceeded (see FIG. 8). Finally, when the infraction becomes critical, the vehicle is gently caused to come to a stop by reducing the maximum vehicle speed parameter limit which reduces the vehicle's speed using Vehicle Speed subsystem 920, FIG. 9.

However, prudent safety operation dictates that the vehicle should always be allowed to move very short distances, such as one hundred feet, just in case the vehicle operator becomes de-authorized at a point which is unsafe, such as a railroad crossing. This gives the de-authorized operator an extra measure of distance to travel.

Finally, a user may be restricted from operating the vehicle further than a certain number of miles from its home to reduce unauthorized trips and joy riding. A regular route vehicle may be limited to a prescribed route of travel and any variation might be strictly prohibited. However, in most instances the parameters are not so strict as to allow the vehicle to be maneuvered around detours.

Figure 7:
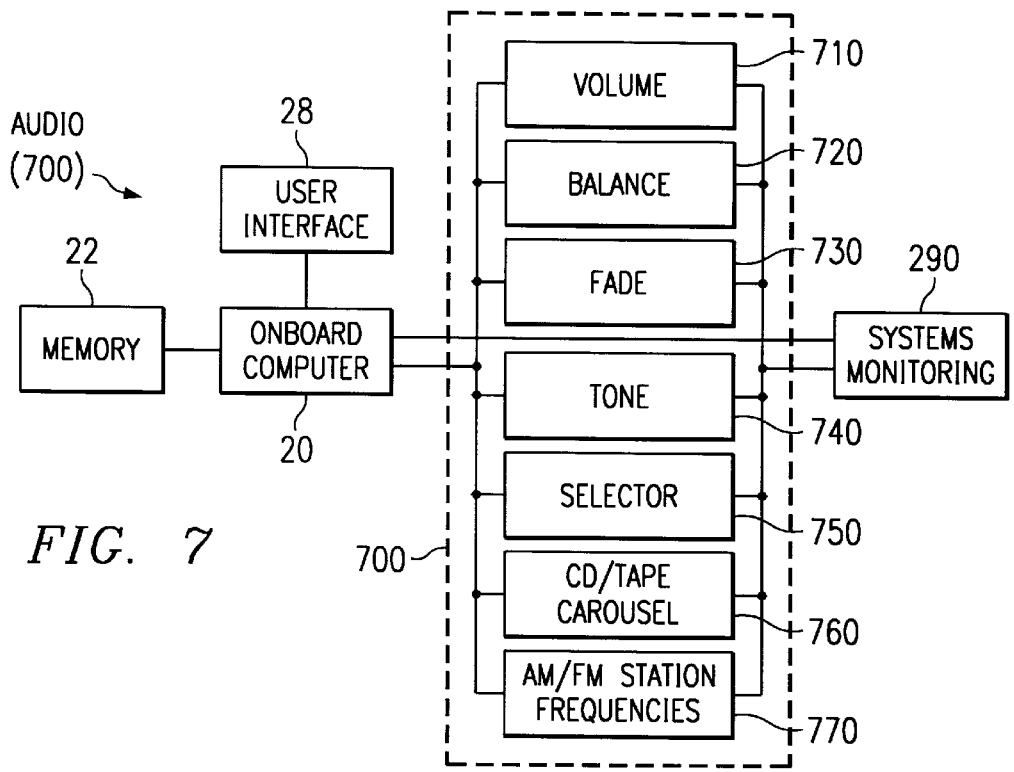
FIG. 7 illustrates another system under the control of the onboard computer, the audio system.

FIG. 7 illustrates another system under the control of the onboard computer, the audio system. Another onboard system which would be particularly convenient for multiple vehicle users would be Audio system 700. Audio system 700 connects to Onboard Computer 20, which restricts access to users who do not possess the required security level. Users such as parking attendants and the like who may be required to operate the vehicle only for short distances, are not expected to use the vehicle's audio system. Audio system 700 would allow each operator to select preferred AM/FM radio stations, compact disks or tape selections for listening. In addition, it would allow the individual users to select unique preferences for volume levels, tone and other audio quality settings. Audio system 700 contains: Volume subsystem 710 for adjusting the volume of Audio system 700; Balance subsystem 720 for adjusting the balance between left and right outputs of Audio system 700; Fade subsystem 730 for adjusting front and rear outputs of Audio system 700; and Tone subsystem 740 or comparable subsystem for adjusting the frequency response or spectral response of the outputted sound. Audio system 700 may also include Selector 750, which selects the user specific devices such as CD, tape, AM/FM radio or other possible outputs. Audio system 700 may also contain CD/Tape Carousel 760, which stores a variety of CDs or tapes on a ready-to-use basis, allowing the user to merely select from an available selection in CD/Tape Carousel 760 rather than having to reload CDs or tapes. Finally, Audio system 700 could include AM/FM Station Frequencies subsystem 770, which includes the user's preferred station settings, along with possible station types and a menu of stations in the vehicle's area.

Audio system 700 works in a fashion similar to the other systems in that the user is identified to Onboard Computer 20 via User Interface 28. Once the computer recognizes the user, the computer then accesses audio preferences which can be stored in computer Memory 22. Those preferences are then transmitted to Audio system 700.

Pre-stored user specific preference settings for volume, balance, fade and tone of the outputted audio adjust the various subsystems such as Volume subsystem 710. Balance subsystem 720, Fade subsystem 730 and Tone subsystem 740. In addition, user-defined preferences stored in Memory 22 would determine which output device the user has chosen to listen to and transmit that information to Selector 750, which then activates the appropriate device, either radio or CD or tape. Once that device is activated, it in turn accesses the tape and selection or CD and selection from the CD/Tape Carousel subsystem 760 or the AM/FM Station Frequencies subsystem 770 and plays the appropriate selection which the user has predefined and stored in Memory 22.

In addition, as the user operates the vehicle, Systems Monitoring system 290 continually monitors manual adjustments by the user to each one of these subsystems. Those adjustments can be used to update the user preferences in the onboard system Memory 22. When the user exits the vehicle, these preferences may be used to replace the previous user specific preferences stored in Memory 22 or may merely be decimated in favor of the pre-stored user specific preferences in Memory 22.

Figure 8:
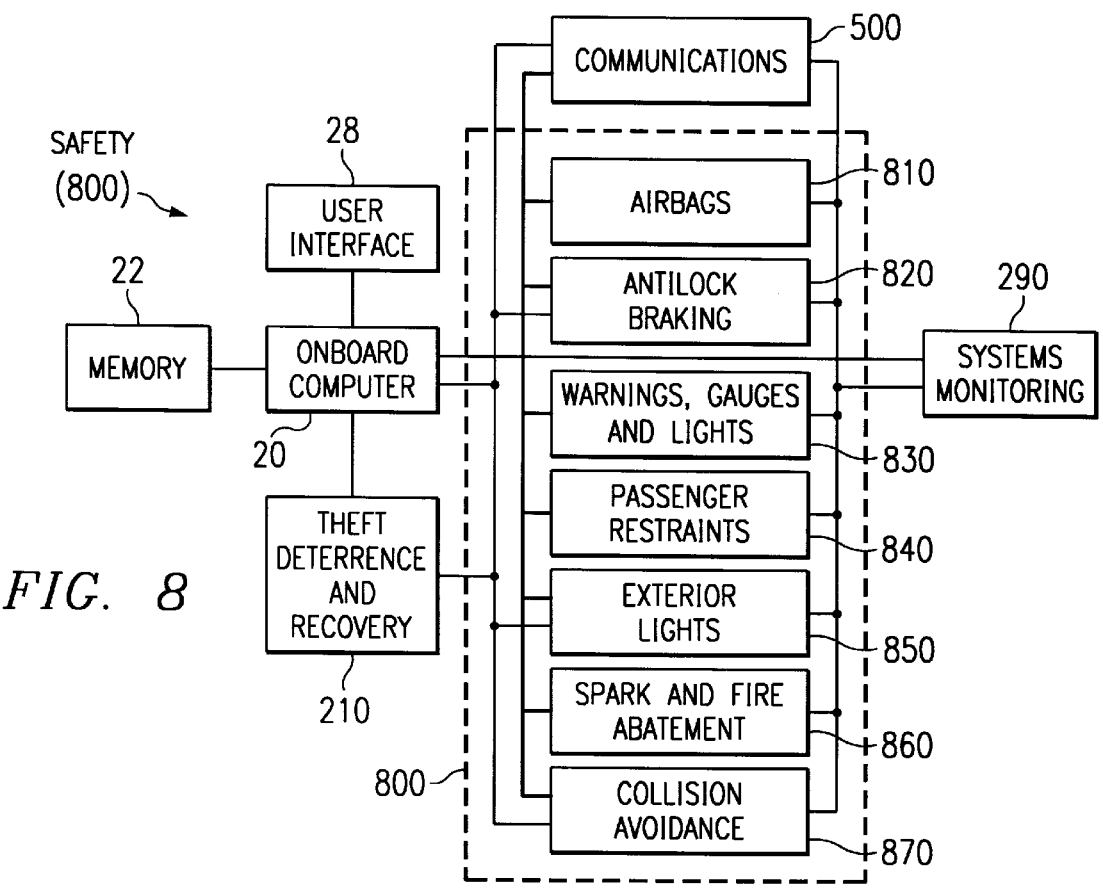
FIG. 8 illustrates the safety system as implemented in the present invention.

FIG. 8 illustrates Safety system 800 as implemented in the present invention. Safety system 800 is contained within the dashed lines of FIG. 8. Safety system 800 of the present invention is authorized only for higher security level users than the systems discussed thus far. Therefore, as the user accesses Onboard Computer 20 via User Interface 28, the user ID supplied by the user is ascertained by Onboard Computer 20. The user ID is then compared to a list of IDs to ascertain the level of security that is authorized for the user associated with this particular ID. Again, as in the other system described above, Onboard Computer 20 would then authorize the user's ID number and retrieve user specific parameters from system Memory 22. The user is granted access to Safety system 800 only if the user is authorized for a higher level of security than the normal use. Therefore, Onboard Computer 20 will only grant control of Safety system 800 to users possessing a master or higher level of security authorization. The user specific parameters would be accessed and applied to the various subsystems within Safety system 800. Safety system 800 contains various subsystems which relate to the safety of the vehicle. Those subsystems include: Airbags 810; Antilock Braking 820; Warnings, Gauges and Lights 830; Passenger Restraints 840; Exterior Lights 850; Spark and Fire Abatement 860; and Collision Avoidance subsystem 870.

In one embodiment, Airbags 810, may be either enables or disabled depending upon the user's preferences or safety needs. For instance, in normal user mode all of the airbags in the car would be active. However, certain users with access to the necessary security level may disable certain airbags via Airbags subsystem 810. In cases where a parent always drives with a young child in a car seat, the airbags adjacent to the car seat might be disabled by setting the appropriate user specific preferences. Alternatively, the user of certain passengers might be of such slight stature that deployment of the airbags may be more hazardous than the accident itself, especially in a low-speed accident. In that case, that user may prefer to disable one or more of the airbags in the passenger compartment via Airbags subsystem 810.

Other preferences might disable antilock braking for certain users via Antilock Braking subsystem 820. Also, Warnings, Gauges and Lights subsystem 830 may have preferences as far as warning defaults and the like, to be set depending on the user's preferences. These may consist of configuring graphic displays to setting warnings messages as either visual, text, voice or audio warnings. Passenger Restraints subsystem 840 might be set to require all passengers to be fully restrained before the vehicle will move. One method of implementing this requirement totally within Safety system 800 would be for vehicle Antilock Braking subsystem 820 to engage the brakes, thereby prohibiting the vehicle from moving until all passengers are fully restrained.

Other subsystems include Exterior Lights subsystem 850, which monitors and controls the exterior lights. Therefore, when an exterior light burns out or is damaged, Systems Monitoring system 290 immediately communicates the status to Onboard Computer 20, and the information is conveyed to the user via User Interface 28 or through Warnings, Gauges and Lights subsystems 830. Another subsystem important to safety is Spark and Fire Abatement subsystem 860. While most terrestrial vehicles possess only minimal spark and fire subsystems, aircraft and marine vehicles require more sophisticated spark and fire abatement subsystems because of the lack of alternatives to operators of non-terrestrial vehicles.

Another subsystem important to the safety of operation is Collision Avoidance subsystem 870. Because collision avoidance is one of the most rapidly changing safety items on a vehicle today, even more advancement in the area of collision avoidance is expected in the future. A collision avoidance subsystem may be further partitioned into front and rear subsystems or even into xyz direction subsystems for vehicles that do not travel along a plane. In one embodiment, Collision Avoidance subsystem 870 is linked inexorably to Antilock Braking subsystem 820, Passenger Restraints subsystems 840 and Airbags subsystem 810. In addition, Collision Avoidance subsystem 870 is connected to Communications/Interface system 500. Collision Avoidance subsystem 870 will continually monitor the vehicle's position with respect to the positions of all other vehicles and obstacles in the proximity of the vehicle. Once the possibility of a collision is detected by Collision Avoidance subsystem 870, Collision Avoidance subsystem 870 attempts to warn the operator through Warnings, Gauges and Lights subsystem 830 using audible and visible alerts intended to make the operator aware that a collision involving this vehicle is likely.

At some point before an imminent collision, Collision Avoidance subsystem 870 may act autonomously to avoid the collision. For instance, Collision Avoidance subsystem 870 may set the antilock brakes via Antilock Braking subsystem 820. Collision Avoidance subsystem 870 may also communicate to the local authorities via Communications/Interface system 500 that a collision involving the vehicle is likely or imminent. Collision Avoidance subsystem 870 may also allow airbags to deploy faster by using Airbags subsystem 810 in combination with Collision Avoidance subsystem 870. Then, rather than relying on the airbags to deploy in response to impact sensors along the bumpers and sides of the vehicle, the user modifies the user specific parameters associated with Collision Avoidance subsystem 870 to deploy the airbags when the vehicle reaches a threshold proximity to the obstruction. Therefore, rather than the airbag being triggered by a certain amount of front or read-end deformation of the vehicle, the airbag deployment is triggered just before the vehicle impacts with the obstruction, thereby saving valuable milliseconds in deployment. Also, changing the user specific parameters to deploy airbags sooner allows for lower speeds of acceleration within the airbags, which has been determined to be advantageous to smaller and lighter users and passengers.

Another embodiment of the present invention, Theft Deterrence and Recovery subsystem 210, might be connected with both Antilock Braking subsystem 820 and Exterior Lights subsystem 850. This combination would allow Theft Deterrence and Recovery subsystem 210 to activate certain exterior lighting configurations and/or antilock brakes at certain times during a vehicle theft. In one example, the user may pre-set certain user specific parameters that would allow a vehicle theft to occur only in certain places. For instance, it might be that the user would allow the vehicle to be stolen from the user's home but not the user's place of business. This is an important safety consideration, being that there is a likelihood of violence occurring during a frustrated theft attempt. Therefore, in attempt to avoid frustrating a potential vehicle thief at the user's home, the user may elect to allow the vehicle to be stolen and then alert the local authorities via Communications/Interface system 500. In addition, Theft Deterrence and Recovery system 210 could reconfigure certain exterior lights that are not visible to the present unauthorized operator. For instance, a vehicle that is being operated by an unauthorized user might be configured to flash one exterior brake light each time the brake pedal is pressed. Therefore, authorities witnessing a flashing rear brake light might have reasonable suspicion to stop such a vehicle and inspect it. In another embodiment, the Antilock Braking subsystem 820 may be set to trigger the brakes upon the unauthorized user traveling one or two miles from the user's home. In that case, the vehicle would become completely inoperable and the unauthorized user would hopefully abandon the vehicle. Thus, the vehicle would be available for safe recovery.

Figure 9:
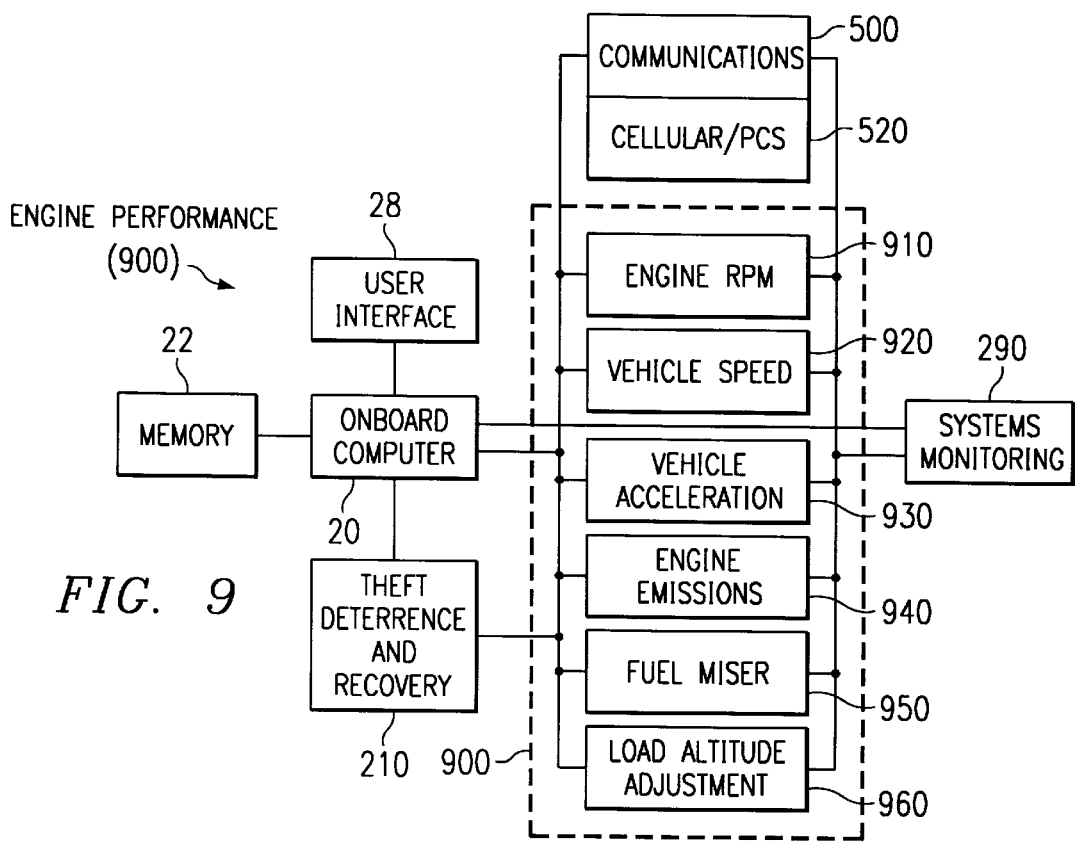
FIG. 9 illustrates the engine performance system as related to the present invention.

FIG. 9 illustrates Engine Performance system 900 as related to the present invention. Like Safety system 800, Engine Performance system 900 requires higher level security for authorization by Onboard Computer 20. User preferences are stored in Onboard Computer 20 system Memory 22 just as in the cases described above. Engine Performance system 900 consists of several possible subsystems, including Engine RPM (i.e., revolutions per minute) subsystem 910; Vehicle Speed subsystem 920; Vehicle Acceleration subsystem 930; Engine Emissions subsystem 940; Fuel Miser subsystem 950; and Load/Altitude Adjustment subsystem 960. Once the user is identified to Onboard Computer 20 via User Interface 28, Onboard Computer 20 analyzes the user ID to ascertain the user's security level.

If the user has a sufficiently high security level, as authorized by Onboard Computer 20, then the user may reset the user specific parameters for the engine performance subsystems in Engine Performance system 900. It would be conducive to safe operation of the vehicle for certain users who do not possess the necessary skill, age or expertise to operate the vehicle safely, to be limited by the vehicle's performance. One way to limit the vehicle's performance is by limiting or restricting the engine's RPM via Engine RPM subsystem 910. The engine might only be allowed to rev up to a certain level, say 4000 RPMs. Such a limitation would be advantageous where there is a possibility that a younger user might have the tendency to race an engine at a stoplight or in a garage to extremely high RPM levels which could damage the interior components of the engine. Another important aspect of the present invention is limitation of the vehicle's speed via Vehicle Speed subsystem 920. Invariably, speed is an important factor in both the frequency and severity of on-the-road accidents. By limiting the vehicle's speed for novice users, the number and severity of these accidents can possibly be decreased. This is also an important concept for vehicles other than on-the-road vehicles, such as airplanes and marine vehicles.

Vehicle acceleration is another important component of a vehicle safety program. If vehicle acceleration is limited via Vehicle Acceleration subsystem 930, the user can only accelerate the vehicle at a certain rate. This reduces the likelihood that younger users who enjoy the fast take-off from a red light or stop sign would participate in such activities. In the case of other vehicles, such as aircraft and marine vehicles, vehicle acceleration may also be measured in deceleration. Extremely rapid deceleration in an airplane or boat can cause the vehicle to become unstable. For instance, in an aircraft extremely rapid deceleration may cause the aircraft to flip or go into a spin that is not recoverable because the vehicle's forward momentum has been lost. Extremely rapid deceleration of a boat causes a wake of water to come over the stern of the boat, thus swamping the vehicle. Therefore, extremely rapid deceleration in aircraft or marine vehicles is highly undesirable.

Another subsystem controlled by Engine Performance system 900 is the Engine Emissions subsystem 940. While Engine Emissions subsystem 940 would generally be inaccessible to the vehicle's operators, it might be advantageous to reduce engine emissions even further below the Environmental Protection Agency (EPA) recommended standards. Therefore, on certain days such as smog alert days and the like, engine emissions may be set to an even stricter standard via Engine Emissions subsystem 940. Clearly this would have a detrimental effect on the performance of the vehicle and would not be appreciated by certain users. In a similar manner, Fuel Miser subsystem 950 may be set to require the vehicle's overall performance to maintain a certain vehicle fuel mileage. Although the vehicle operator may be allowed one or two quick accelerations, thereafter the performance of the vehicle would be strictly limited to make up for those accelerations and maintain the overall fuel efficiency of the vehicle.

Finally, Engine Performance system 900 contains Loan/Altitude Adjustment subsystem 960. Load/Altitude Adjustment subsystem 960 would change the engine's performance depending upon the altitude of the vehicle and the load the vehicle is carrying. Thus, when the vehicle is heavily loaded, as in the case of a truck pulling a boat, the vehicle performance characteristics would change from being a faster or faster accelerating vehicle to that of being a vehicle that is more adept for towing, especially up hills, boat ramps and the like. This, of course, would be at the expense of other performance characteristics in the subsystem.

As in Safety system 800, Engine Performance system 900 would be inexorably linked to Theft Deterrence and Recovery subsystem 210. Once Theft Deterrence and Recovery subsystem 210 detected an unauthorized user, the engine performance parameters stored in Memory 22 would set Engine Performance system 900 to levels that would make the vehicle inoperable. For instance, Vehicle Speed 920 parameters might be set to limit the vehicle to zero speed, and Engine RPM subsystem 910 might be set to limit the engine to zero RPM. Also, Vehicle Acceleration subsystem 930 could be set to zero. Thus, the vehicle's engine would be rendered inoperable.

The process of the present invention as described with respect to FIGS. 1 to 10, will now be discussed with respect to FIGS. 11 to 13.

Figure 10:
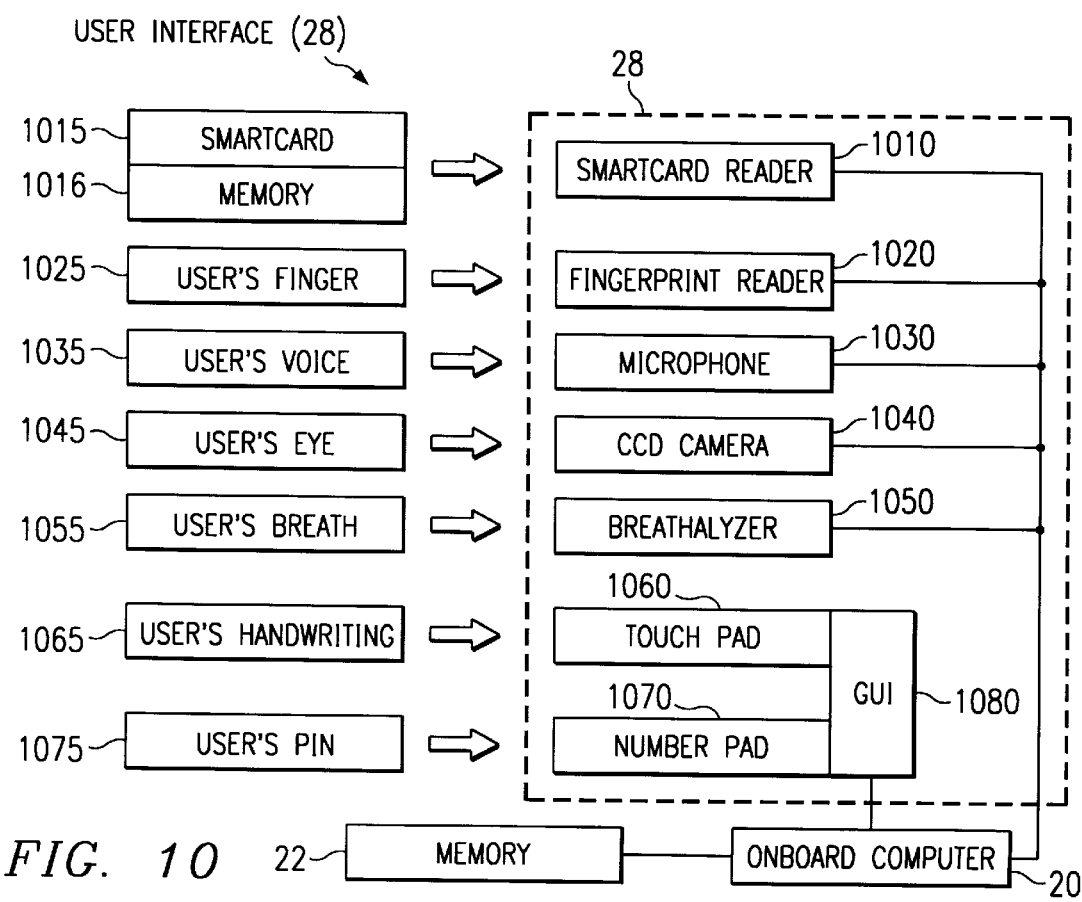
FIG. 10 illustrates the user interface system as implemented in the present invention.

Another important aspect of the present invention is how the user interfaces with Onboard Computer 20. FIG. 10 illustrates the user interface system as implemented in the present invention. User Interface system 28 may employ a variety of different subsystems, singularly or in combination with each other. One of the exciting new concepts to be available involves SmartCard 1015 and SmartCard Reader 1010. SmartCards are well known in the industry and will not be described in detail here; but for the purpose of this invention, SmartCard 1015 contains at least Memory 1016 which is read by SmartCard Reader 1010. When a user enters the vehicle, the user is identified by swiping SmartCard 1015 in SmartCard Reader 1010. Onboard Computer 20 recognizes the input from SmartCard Reader 1010 and accesses Memory 22 for information concerning the user. In one embodiment, Onboard Computer 20 merely checks the data available from Memory 1016 on SmartCard 1015 with the data for the particular user stored in onboard system Memory 22. In other embodiments, Onboard Computer 20 works in concert with a processor (not shown) on SmartCard 1015 in a series of ID verification steps designed to authorize the user.

Another advantage of SmartCard 1015 is that SmartCard Memory 1016 may contain other than merely numeric data. Memory 1016 may include all data pertaining to the owner of the SmartCard, including all user specific preferences applied in setting the various functions and sub-functions of the vehicle. Memory 1016 might also include user identification data such as the user's fingerprint pattern, the user's voice print pattern, the user's iris print pattern or the user's handwriting pattern. In one example, the card could actually initiate the authorization process via Onboard Computer 20. The user would then be required to confirm identity on a second user interface, such as Fingerprint Reader 1020.

Importantly, SmartCart Memory 1016 can be used to store user specific parameters for one vehicle or for several vehicles. In that same way, Memory 22 may store the user specific parameters for all users authorized to operate the vehicle.

System fraud and vehicle theft could be greatly reduced if the intended user who has authorized SmartCard 1015 could also be confirmed as the actual operator of the vehicle. The surest way to achieve this goal is to register some biological attribute of the user with the vehicle interface. The most widely used biological attribute that identifies users is their picture. The second most useful, and probably the easiest for an onboard system to analyze, would be a user's fingerprint. In another embodiment of the present invention, once SmartCard 1015 is read by SmartCard Reader 1010 and authorized by Onboard Computer 20, the user is then required to input User's Finger 1025 via Fingerprint Reader 1020. Onboard Computer 20 then compares the user's fingerprint pattern to either a fingerprint identified with the user's data stored in onboard Memory 22 or stored on SmartCard Memory 1016. Once the user has been identified by Onboard Computer 20 as the rightful possessor of the SmartCard 1015, Onboard Computer 20 then allows the user to access the highest level of security authorized within Onboard Computer 20.

Verification of a user's ID may be accomplished by a number of other means, including Touch Pad 1060 or Number Pad 1070 via Graphical User Interface (GUI) 1080. While GUI 1080 is advantageous, it is not essential to practice the present invention. In fact, GUI 1080 may include Touch Pad 1060 or it may not, or it may include Number Pad 1070 or it may not, or any one of the three could be used in combination. In another embodiment, the present invention may require user identification via a voice print stored in system Memory 22 or on SmartCard 1015 Memory 1016. In that case, User Interface system 28 includes Microphone 1030. The user interfaces with the system by inputting User's Voice 1035 to Microphone 1030 and then Onboard Computer 20 compares the voice pattern with that of the user's voice pattern stored in system Memory 22 or SmartCard 1015 Memory 1016.

Other possible means of verifying the user's identity include the user's iris pattern. In this case, CCD Camera 1040 would input an image of User's Eye 1045 to Onboard Computer 20 for analysis and comparison with an iris pattern stored in system Memory 22 or on SmartCard Memory 1016. In another embodiment, User Interface 28 might include a sample of the user's handwriting within system Memory 22 or within SmartCard Memory 1016. The user would input a pre-determined sentence or series of words on Touch Pad 1060 as directed by the output of GUI 1080. Onboard Computer 20 then compares that series of slashes and gestures with the pattern stored in system Memory 22.

In another embodiment of the present invention, the user is merely required to enter the proper personal User's PIN 1075 via Number Pad 1070. Although generally the personal identification number is an unchanging number that the user always possesses, recently and with the advent of GUIs, the personal identification number is more than merely a number. For instance, the personal identification number can actually be an operation the user applies to a number of an 'algorithmic password.' An example of an algorithmic password is to display a number to the user, such as '1234,' via GUI 1080. An algorithm known only to the user might be to subtract each of the outside digits from 10 and transpose the two inner digits. This, in response to seeing the number '1234,' the user inputs the number '9326' on GUI 1080. Even someone watching the user input that number would have no idea what algorithm the user applied to the display number, as the operation is known only to the user. More complicated algorithms can be formulated to test the dexterity of the user. Such dexterity tests are well known as effective in deterring intoxicated users and users who are incapable of safely operating a vehicle due to lack of sleep or illness.

In the final embodiment, User Interface 28 may include Breathalyzer 1050 to test User's Breath 1055 for alcohol content. A user that has been prone to drive while under the influence of drugs or alcohol would be required to demonstrate sobriety before being allowed to operate the vehicle. In this case, User's Breath 1055 can be analyzed by Onboard Computer 20 to detect the presence of known intoxicants. The user may be given several opportunities to pass the breathalyzer test before the user is de-authorized and the vehicle is disabled by Onboard Computer 20.

Finally, a user possessing a sufficiently high security level, such as a master user or an administrator, may authorize subsequent identification verification by proxy, thereby allowing access to certain onboard systems by users which have been denied access on a verification basis. This is an important feature for resolving identification verification problems brought about by failure of an identification verification subsystem.

An important aspect of the present invention is that one or all of these identification verification subsystems can be included in User Interface system 28. The advantage of SmartCard 1015 is that it contains Memory 1016, which can be updated and obliterated while not in contact with Onboard Computer 20. Unlike onboard computer Memory 22, SmartCard 1015 can be read and updated while the user is not in the vehicle, in fact while the vehicle is not even in the user's possession. Therefore, the user specific preferences stored on SmartCard Memory 1016 can be updated by someone other than the user, placing the user at the mercy of the fleet dispatcher or vehicle owner or parents, or whomever is ultimately responsible for the vehicle. Also, the SmartCard might contain user preferences for a variety of different vehicles.

Alternatively, SmartCard Memory 1016 contains user specified parameters in an independent device format. By using an independent device format for storing user specified parameters, the user may set specified parameters which are desired for use by a variety of different vehicles and vehicle types. The device-independent parameters would then be transformed into device-dependent parameters by the onboard computer of any vehicle in which the SmartCard is inserted. While some parameters may require some fine tuning or tweaking once the user becomes accustomed to each different vehicle, the majority of the user specified parameters will fulfill the user's expectations without tweaking. Tremendous memory savings are achieved by storing user specific parameters in device-independent format on the SmartCard. Rather than storing multiple sets of user specific parameters on a variety of different vehicles, the one set of user specified parameters which is stored on the SmartCard is transformed into device-dependent parameters by any onboard computer of a specific vehicle into which the SmartCard is inserted.

Figure 11:
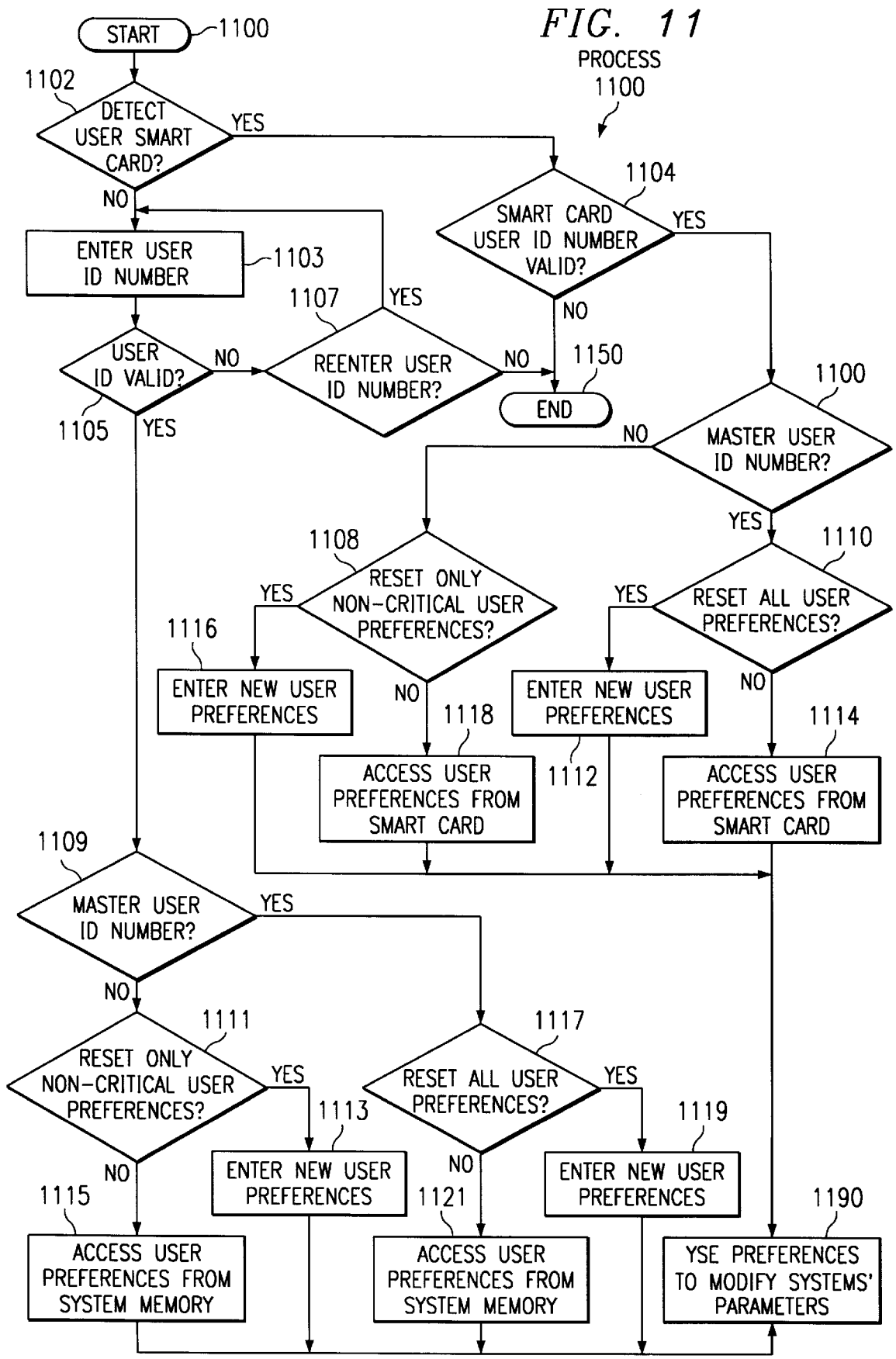
FIG. 11 illustrates one embodiment of the present invention, the process of a user being granted access to the user specific preferences.

FIG. 11 illustrates one embodiment of the present invention, that of a user being granted access to the user specific preferences which modify the systems and subsystems parameters. The process starts at step 1100. Initially, the system is set to detect a SmartCard (step 1102). If no SmartCard is detected, the system then requires the user to enter a user ID number (step 1103). Onboard Computer 20 then checks system Memory 22 to determine if the user ID is valid (step 1105). If the user ID is not valid, the user may then be allowed to reenter the ID number several times (step 1107). If validity remains unconfirmed, the process ends (step 1150). Once the ID number is determined to be valid by Onboard Computer 20, it is then checked against the list of master user ID numbers (step 1109).

In the depicted example, only two levels of security are used for simplicity. In actuality, a user may be authorized for one or more security level(s). For instance, in addition to low level security or master level security, a user may also possess administrator level security, service attendant level security, parking attendant level security or semi-user level security. Another, more specialized security level might also be available for special purpose operation of the vehicle, such as thief level security and drunk driver level security, both of which severely limit access and performance of the vehicle. This would greatly aid authorities in curtailing a user who has been convicted of a specific infraction by limiting access and operation of a vehicle.

Therefore, a user who has been convicted of certain conduct involving the operation of a vehicle could be prohibited from using a vehicle in that manner via settings of user specific preferences that regulate that conduct. One example is a user who has been convicted of driving at excessive speed. In order to prohibit this user from operating the vehicle at excessive speeds, the administrator or other user having a sufficiently high security level limits that user's vehicle maximum speed preference.

In one embodiment, Onboard Computer 20 evaluates the vehicle's operation looking specifically for erratic operating behavior such as swerving, excessive acceleration/deceleration or speed, etc., and then de-authorizes the user from the present security level and re-authorizes the user in drunk driver level security. Thus, the performance parameters of the vehicle are automatically reset, limiting the performance of the vehicle, such as acceleration rate, maximum speed limit and the like. Depending on the preferences set by the administrator, once Onboard Computer system 20 senses that the present operator should be de-authorized and re-authorized under the drunk driver security level, Onboard Computer 20 initiates the sequence by completely de-authorizing the user. De-authorizing the user causes the vehicle to come to rest by reducing the maximum vehicle speed parameter, as described above. Then the user is forced to be re-authorized under the new drunk driver security level. This may include sobriety testing using Breathalyzer 1050.

In addition, Onboard Computer 20 may evaluate the list of known users before granting authority under certain levels of security. An intoxicated driver might attempt to circumvent security by gaining limited access in thief level security. However, Onboard Computer 20 will not authorize a user under thief security level if another user on the list has been authorized under the drunk driver security level. This precaution reduces the likelihood that an intoxicated driver will input another user's PIN or SmartCard and thus gain access to operate the vehicle under thief security level authorization, because Breathalyzer 1050 may administer the sobriety test in either case.

The description of the present invention will now turn to processes used in setting user preferences in accordance with a preference embodiment of the present invention. FIGS. 11 through 13 describe processes used to set preferences for users.

Returning to FIG. 11, if Onboard Computer 20 confirms the user to have a master level security authorization on the basis of the user ID number, the user is then granted access to all systems requiring master level security authorization. In one embodiment, a user may only be allowed to reset specific preferences if the user affirms the intent to do so. In that embodiment, the use would be queried as to whether he intends to reset any of the preferences or merely requires access to the preferences that are available from Memory 22 (step 1117). If the user intends to enter new preferences, the user would be allowed to do so (step 1119). Those preferences could either be stored automatically in Memory 22 or the user could be asked if the user intends to store them (step not shown). On the other hand, the user may not intend to reset any preferences. In that case, Onboard Computer system 20 would merely access user preferences from the system Memory 22 (step 1121) and apply them to the appropriate systems.

Returning to block 1109, if Onboard Computer system 20 determines that the user does not have a master ID number, then the user is queried whether the user intends to reset only non-critical preferences (step 1111). If the user intends to reset only non-critical preferences, the user is allowed to do so (step 1113) as before. If the user intends only to access user preferences from Memory 22 (step 1115), then the system merely accesses the preferences stored in the system Memory 22 which are associated with the user ID number.

If it is determined at step 1102 that the user is using a SmartCard, then Onboard Computer system 20 checks to determine if the SmartCard user number is valid (step 1104). If the SmartCard does not validate, the system ends the process (step 1150). If the SmartCard is valid, the process progresses down a parallel path using only the ID number. First, Onboard Computer 20 determines from system Memory 22 whether it is a master use ID number (step 1100). If it is a master ID number, the system then queries the user as to intention of resetting preferences (step 1110). The master ID designation might also reside on SmartCard 1015 Memory 1016. If the user intends to reset and enter new preferences, the user is allowed to do so (step 1112). If not, the user merely accesses the preferences from the SmartCard 1015 Memory 1016 (step 1114). Alternatively, the preferences could be accessed from the system Memory 22 or by some combination from the SmartCard and the system Memory 22. If, on the other hand, the user's ID number was determined not to be a master ID number, then the user is queried if he intends to reset only non-critical user preferences (step 1108). If the user intends not to reset non-critical user preferences, the user then enters the preferences (step 1116). If the user intends not to reset non-critical user preferences he accesses user preferences from the SmartCard (step 1118). Clearly, whenever the user intends to enter new user specific parameters or preferences, the system will always use those preferences to replace preferences that were available initially either from the onboard system Memory 22 or SmartCard Memory 1016. In any event, once the user specific preferences are available, Onboard Computer 20 transfers the user specific preferences to the appropriate onboard systems and subsystems to modify the parameters of those systems and subsystems.

Figure 12:
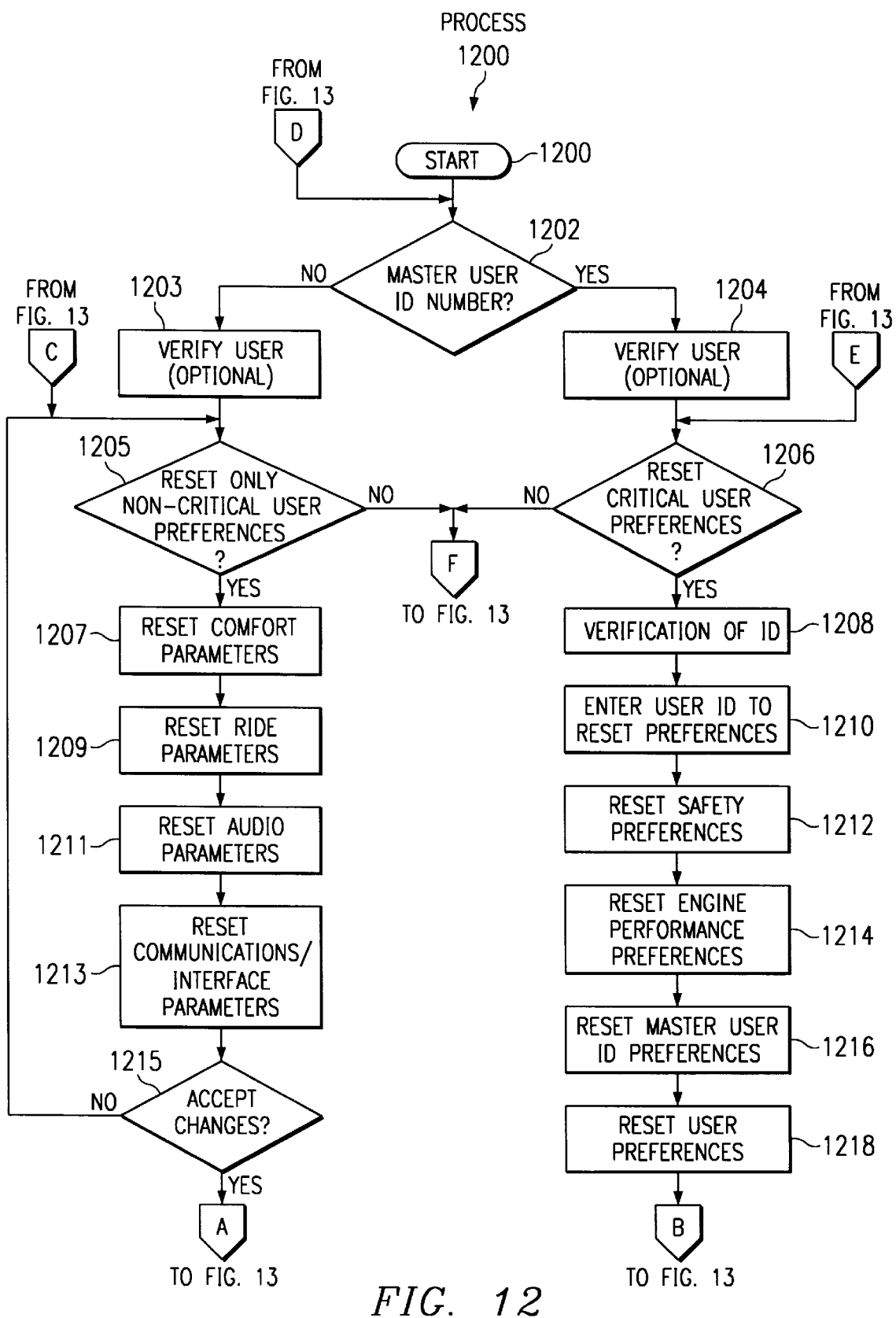
FIGS. 12 and 13 illustrate one embodiment of that modification process.
Figure 13:
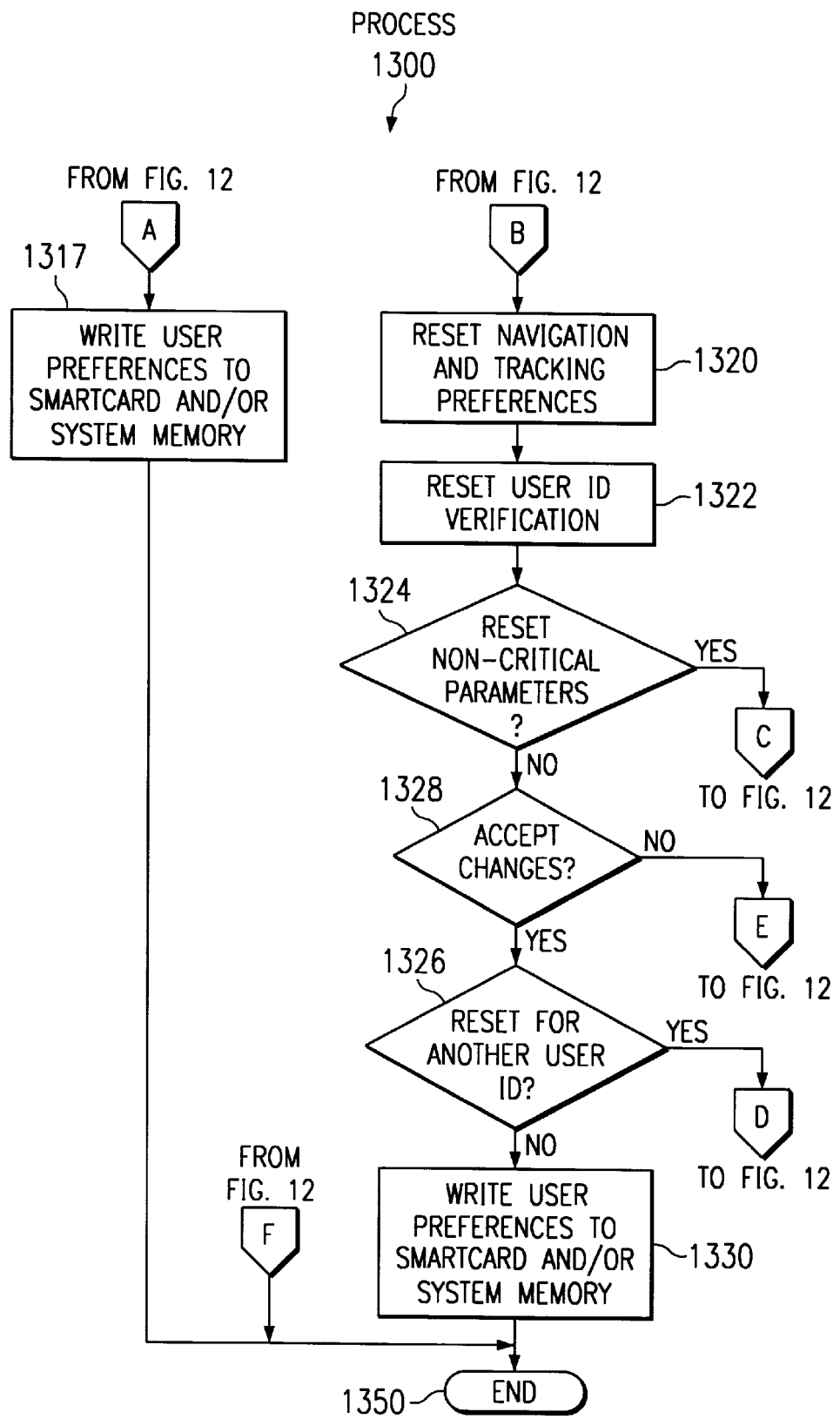

FIGS. 12 and 13 illustrate one embodiment of that modification process. The process starts at step 1200. Again, as in FIG. 11, the system looks to determine if a master user ID number is being input to the system (step 1202). If a master user ID number has been detected by Onboard Computer 20, the user may be required to verify the ID. This verification may employ any of the subsystems discussed above with respect to FIG. 10. For instance, the user may be required to input the user's fingerprint (1025) or voice (1035). The user may be required to look into a CCD Camera 1040 in order to uptake an image of the user's iris, or the user may be required to submit a brief handwriting sample 1065 via a touch pad 1060. Additionally, the user may be required to perform some operation with numbers displayed for the user. Onboard Computer 20 may then query the user as to intent to reset critical user preferences (step 1206). If a verification of the input was not required above at step 1204, the user then may be required to verify ID (step 1208). This would ensure that only persons with the appropriate level of security could reset critical parameters. Once Onboard Computer 20 determines that the master user ID number assigned to the user is valid, the user may then make changes to the master level security systems and subsystems.

One important system not yet discussed is the ability to set and reset ID numbers and user specific parameters associated with other ID numbers. This would allow master users to reset user specific parameters for other users and to authorize other users as master users. A master user may then go on to set other user specific preferences with respect to systems requiring a master level security to access. For example, the master user may reset the safety preferences (step 1212), engine performance preferences (step 1214), master ID preferences (step 1216), user preferences (step 1218), navigational tracking preferences (step 1320) and the user's own user ID verification (step 1322). Next, Onboard Computer 20 may query the user as to intent of resetting non-critical parameters (step 1324). Assuming the user does not intend to reset these, the user then may be allowed to reset master security systems for other users (step 1326). Finally, the user is asked by the system to confirm the changes (step 1328). If the changes are not confirmed, the system restarts at step 1206. If the changes are accepted, then the user preferences are written to the SmartCard or to the system Memory 22 (step 1330). The process then ends at step 1350.

If, on the other hand, at step 1202 the user's ID number is determined not to be a master user ID number, the system then may require additional verification as described above at step 1203. The system then queries the user as to intent to reset only non-critical preferences (step 1205). If the user intends to reset non-critical preferences, the user may then go to each of the non-critical systems and reset only the desired user specific parameters. For instance, the user may reset the comfort parameters (step 1207); he may reset the ride parameters (step 1209); he may reset the audio parameters (step 1211); or he may reset communications/interface parameters (step 1213). As above, the user is then asked by Onboard Computer 20 through User Interface 28 if he accepts the changes (step 1215). If not, the process returns to step 1205 and the system asks if he intends to reset any non-critical user preferences. If he does intend to accept the changes, the user preferences are written to the SmartCard and/or system Memory 22 at step 1317. The process then ends at step 1350.

FIGS. 14 to 21 illustrate the data structures of the present invention, which can be stored in SmartCard Memory 1016, Onboard Computer 20 Memory 22, or even as encrypted information on a swipe card. At a low level, the data structure contains several fields of data which are unique to the user. User Record 1400 shows fields having user ID vertification, security level preference limits and user logged data. Each field of User Record 1400 is in turn dynamically linked to other lists containing more detail associated with the fields listed under User Record 1400.

FIG. 15 illustrates the User ID data structure. User ID data structure 1500 has two fields, the user's name and the user's ID number. Either of these fields can be used as a means to identify a user and then retrieve data concerning the user from one of the above-mentioned memories.

FIG. 16 illustrates the Verification data structure 1600. Once the user has been identified, a verification sequence takes place as described above discussing User Interface 28. Pertinent data used in identification of the user are stored in Verification 1600 data structure or, alternatively, links may be provided for memory addresses where pertinent data is located in memory. Verification 1600 data structure contains a password known only to the user which may be in the form of a pin number, algorithmic password, handshake data for verifying the user's SmartCard, pertinent finger print data, eye print data, voice print data, and finally, a field for verifying a proxy which has been authorized by a user at the master security level or higher. The information contained in these fields is used to verify that the person intending to operate the vehicle is actually the person who is identified in User ID 1500.

FIG. 17 illustrates Security Level data structure 1700. Once positive identification of the user has been established, the user is granted a security level by Onboard Computer 20. Security Level 1700 data structure shows different levels of security. As mentioned before, these are normal user, master user, administrator, service center, parking attendant or semi-user, thief and, finally, drunk driver. Each level of security authorizes the user to access a prescribed set of preferences and preference limits that are associated with that particular security level. As described above, a normal user is grated access to all of the non-critical systems of the vehicle. Therefore, the normal user can then re-set preferences in any one of those non-critical systems or subsystems. A master user, on the other hand, is given access to even more preferences, including the more critical systems. A master user can not only set preferences associated with the non-critical systems, but can also set preferences associated with the critical systems.

FIG. 18 illustrates an extremely abbreviated data structure of possible Preferences. Preferences 1800 data structure includes seat adjustments, temperature adjustments, radio/entertainment system adjustments, telephone number settings, ride preferences, acceleration preferences, warning message preferences and airbag settings fields. In actuality, the number of potential preferences to be set would at least be equal to the number of subsystems being controlled by Onboard Computer 20 and may include many times more, as each subsystem may have several associated user specific preferences. An administrator, however, may be authorized to do more than set preferences, whether critical or non-critical. An administrator may be authorized to set preference limits for all users of the particular vehicle.

FIG. 19 illustrates Preference Limits 1900 data structure. In many ways, preference limits would act as system default preferences. Once preference limits are entered in the fields associated with Preference Limits 1900 data structure, they would be retaining in Onboard Computer 20 Memory 22 as the system defaults. In this example, preference limits can only be reset by a user having an administrator security level. Therefore, while certain users such as master level users may be able to adjust user specific preference settings within these limits, a master user may not be able to adjust user specific preferences above the preference limits.

FIG. 20 illustrates User Logged Data 2000 data structure. As briefly discussed above, User Logged Data 2000 data structure is indexed by user and compiled by Onboard Computer 20 from events occurring during the user's control of the vehicle. For instance, the first three fields contain routine maintenance and operator log information, hours of engine time, hours logged in and miles traveled. The fourth field concerns the amount of money that was spent by the user. In one embodiment, the SmartCard may have a predetermined cash value. As the user proceeds along the trip and consumes goods and services needed during that trip, the amount of cash consumed could be automatically logged in this field. Other fields concerning the vehicle's operation include maximum speed attained, the average speed maintained, the average acceleration, maximum engine RPM, data regarding antilock brake engagement, traction control data and data regarding airbag deployment.

Other fields that might be useful for an administrator or persons having responsibility for the vehicle, might be the maximum distance from home the vehicle traveled, the maximum distance from a set route the vehicle traveled, the maximum distance tracked from a pre-set destination and a GPS trip backing field. A GPS trip tracking field would probably be linked to graphic data compiled by Navigation and Tracking system 600 using Maps and Databases subsystem 620 and GPS system 610. There, an administrator could view a graphic image of the exact routes the vehicle traveled, including time annotations.

Finally, a field for services used while a particular user operated the vehicle is provided. This also may be linked to another list tracking such things as the amount of fuel purchased, services rendered to the vehicle such as washings or lube jots, etc. or towing amounts.

FIG. 21 illustrates an example of how Onboard Computer 20 authorizes user specific preferences by user security level. In the example in FIG. 21, Security Level 1700 data structure indicates that the user has been identified as a normal user. This is seen as the normal user field being highlighted while the remaining user fields are de-emphasized and presented in italics. When Preferences 1800 data structure is pulled up for the user authorized as a normal user, certain fields remain active while other fields are de-activated. Active fields for a normal user would include such preferences as seat adjustments, temperature adjustments, radio/entertainment system adjustments, telephone number settings and ride preferences. Preferences not under the control of a normal user might be acceleration, warning message preferences and airbag settings. This is an important concept because, while a user may be allowed to set the user's own specific preferences in every field, Onboard Computer 20 will only accept those fields which have been authorized under that security level.

In the depicted example, a normal user is not authorized to set acceleration preferences, warning message preferences or airbag settings. Therefore, even if a user record contains entries in those fields, Onboard Computer 20 uses the default settings already available to it in Memory 22, which were preset by a system administrator, thereby prohibiting the normal user from inputting the entries in those fields.

It is important to note that while the present invention has been described in the context of a fully functioning data processing system, those of ordinary skill in the art will appreciate that the processes of the present invention are capable of being distributed in a form of a computer readable medium of instructions and a variety of forms, and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description but is not limited to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for modifying an onboard data processing system in a vehicle using user specific data parameters, the method comprising:

invoking a user identification feature;

accessing an onboard memory for user identification information;

identifying a user using the user identification feature, in accordance with the user identification information, wherein the user is an identified user;

accessing the onboard memory for a security level for the identified user;

authorizing the identified user at a predetermined user security level;

unlocking control of at least one onboard system, wherein the at least one unlocked onboard system requires a user security level equal to the predetermined user security level for the identified user;

accessing a portable memory for at least one user specific data parameter;

applying the at least one user specific data parameter to a locked onboard system; and modifying at least one function of the locked onboard system in accordance with the at least one user specific data parameter.

2. The method of claim 1 wherein the at least one user specific data parameters includes one of comfort parameters, performance parameters and safety parameters.

3. The method of claim 1 wherein the user identification feature includes one of a personal identification number, password, algorithmic password, voice pattern, fingerprint pattern, iris pattern and handwriting pattern.

4. The method of claim 1 wherein the onboard system includes one of climate control, seat adjustment, mirror adjustment, engine performance, suspension adjustment, ride control, user dexterity testing, user sobriety testing, vehicle speed limitation, vehicle acceleration limitation, vehicle navigation, vehicle tracking, vehicle use log, airbag, user restraint, buoyancy, plane, theft deterrence and user qualification verification.

5. The method of claim 1 further comprises:

storing at least one user specific data parameter in the portable memory.

6. The method of claim 1 further comprises:
modifying at least one user specific parameter; and
storing the modified at least one user specific data parameter in the portable memory.

7. The method of claim 1, the step of authorizing further comprises:
sensing a biological user identification feature;
transforming the sensed biological user identification feature to biological user identification feature data;
accessing the onboard memory for data corresponding to the biological user identification feature;
comparing the biological user identification feature data to the data corresponding to the biological user identification feature; and
unlocking at least one onboard system based on comparison.

8. The method of claim 1 wherein the vehicle is one of an automobile, off-road vehicle, truck, train, power boat, sail boat, barge, powered aircraft, airplane and sailplane.

9. The method of claim 1 wherein the user specific parameter includes limitation on the maximum distance the vehicle is authorized to travel from a predetermined location.

10. The method of claim 1 wherein the user specific parameter includes limitation on the maximum distance the vehicle is authorized to travel from a predetermined route.

11. The method of claim 1 wherein the user specific parameter includes limitation on the maximum distance the vehicle is authorized to travel from a predetermined location off of a preset route.

12. The method of claim 1 further comprises:
defining a user specific limiting parameter for limiting the magnitude of the user specific parameter applied to the onboard system.

13. An onboard data processing system for implementing user specific data parameters, the system comprising:
invoking a user identification feature;
accessing means for accessing an onboard memory for user identification information;
identifying means for identifying a user using the user identification feature, in accordance with the user identification information, wherein the user is an identified user;
accessing means for accessing the onboard memory for a security level for the identified user;
authorizing means for authorizing the identified user at a predetermined user security level;
unlocking means for unlocking control of at least one onboard system, wherein unlocking control of the at least one onboard system requires a user security level equal to the predetermined user security level for the identified user;
accessing means for accessing a portable memory for at least one user specific data parameter;
applying means for applying the at least one user specific data parameter to a locked onboard system; and
modifying means for modifying at least one function of the locked onboard system in accordance with the at least one user specific data parameter.

14. The system of claim 13 wherein the at least one user specific data parameter includes one of comfort parameters, performance parameters and safety parameters.

15. The system of claim 13 wherein the user identification feature includes one of a personal identification number, password, algorithmic password, voice pattern, fingerprint pattern, iris pattern and handwriting pattern.

16. The system of claim 13 wherein the onboard system includes on of climate control, seat adjustment, mirror adjustment, engine performance, suspension adjustment, ride control, user dexterity testing, user sobriety testing, vehicle speed limitation, vehicle acceleration limitation, vehicle navigation, vehicle tracking, vehicle use log, airbag, user restraint, buoyancy, plane, theft deterrence and user qualification verification.

17. The method of claim 13 further comprises:
storing means for storing at least one user specific data parameter in the portable memory.

18. The method of claim 13 further comprises:
modifying means for modifying at least one user specific parameter; and
storing means for storing the modified at least one user specific data parameter in the portable memory.

19. The method of claim 13, the authorizing further comprises:
sensing means for sensing a biological user identification feature;
transforming means for transforming the sensed biological user identification feature to biological user identification feature data;
accessing means for accessing the onboard memory for data corresponding to the biological user identification feature;
comparing means for comparing the biological user identification feature data to the data corresponding to the biological user identification feature; and
unlocking means for unlocking at least one onboard system based on comparison.

20. The system of claim 13 wherein the vehicle is one of an automobile, off-road vehicle, truck, train, power boat, sail boat, barge, powered aircraft, airplane and sailplane.

21. The method of claim 13 wherein the user specific parameter includes limitation on the maximum distance the vehicle is authorized to travel from a predetermined location.

22. The method of claim 13 wherein the user specific parameter includes limitation on the maximum distance the vehicle is authorized to travel from a predetermined route.

23. The method of claim 13 wherein the user specific parameter includes limitation on the maximum distance the vehicle is authorized to travel from a predetermined location off of a preset route.

24. The method of claim 13 further comprises:
defining means for defining a user specific limiting parameter for limiting the magnitude of the user specific parameter applied to the onboard system.

25. A computer program product including instructions for modifying an onboard data processing system by implementing user specific data parameters embodied on a computer readable medium, the instructions comprising:
invoking instructions for invoking a user identification feature;
accessing instructions for accessing an onboard memory for user identification information;
identifying instructions for identifying a user using the user identification feature, in accordance with the user identification information, wherein the user is an identified user;
accessing instructions for accessing the onboard memory for a security level for the identified user;

authorizing instructions for authorizing the identified user at a predetermined user security level;

unlocking instructions for unlocking control of at least one onboard system, wherein unlocking control of the at least one onboard system requires a user security level equal to the predetermined user security level for the identified user;

accessing instructions for accessing a portable memory for at least one user specific data parameter;

applying instructions for applying the at least one user specific data parameter to a locked onboard system; and modifying instructions for modifying at least one function of the locked onboard system in accordance with at least one user specific data parameter.

26. The computer program product of claim 25 further comprises:

instructions for modifying at least one user specific parameter; and instructions for storing the modified at least one user specific data parameter in the memory.

27. The computer program product of claim 25, the instruction of authorizing further comprises:

instructions for sensing a biological user identification feature;

instructions for transforming the sensed biological user identification feature to biological user identification feature data; p1 instructions for accessing the onboard memory for data corresponding to the biological user identification feature;

instructions for comparing the biological user identification feature data to the data corresponding to the biological user identification feature; and instructions for unlocking at least one onboard system based on comparison.

28. The computer program product of claim 25 further comprises:

instructions for defining a user specific limiting parameter for limiting the magnitude of the user specific parameter applied to the onboard system.

29. A method for modifying an onboard data processing system in a vehicle using user specific data parameters, the method comprising:

invoking a user identification feature;

accessing an onboard memory for authorized user identification information;

receiving user identification information from a user attempting to be authorized;

comparing the user identification information with the authorized user identification information;

authorizing the user based on the outcome of the comparison;

accessing the onboard memory for user security level information in response to the user being authorized;

determining a security level for the authorized user;

unlocking control of a plurality of onboard systems, wherein control of the plurality of onboard systems requires a user security level equal to the security level for the identified user;

receiving a plurality of user specific data parameters from a portable memory, wherein the plurality of user specific data parameters correspond to a plurality of specific onboard systems;

applying the plurality of user specific data parameters to the plurality of locked onboard systems; and modifying functions of the plurality of locked onboard system in accordance with the plurality of user specific data parameter.

30. The method of claim 29 wherein the portable memory is contained on a smart card, prior to invoking a user identification feature the method further comprises:

invoking a smart card user identification feature;

accessing the portable memory for smart card authorized user identification information;

receiving user identification information from a user attempting to be authorized by the smart card;

comparing the user identification information with the smart card authorized user identification information; and authorizing the user for the smart card based on the outcome of the comparison.

31. The method of claim 30, wherein the at least one critical onboard system includes at least one of an onboard safety system, an onboard engine performance system and an onboard user identification feature.

32. The method of claim 29, wherein the authorized user is determined to have a high security level, the method further comprises:

resetting critical user parameters for at least one critical onboard system, wherein critical user parameters are included in user specific data parameters and the at least one critical onboard system is included in the plurality of onboard systems.

33. The method of claim 29, wherein the authorized user is determined to have a predetermined security level, the method further comprises:

monitoring vehicle operating characteristics;

comparing the monitored operating characteristics to a predefined set of operating characteristics for the predetermined security level;

reducing the user security level based on comparing the monitored operating characteristics to a predefined set of operating characteristics; and locking control of at least one onboard system, wherein control of the at least one onboard system requires a higher user security level than the reduced user security level for the identified user.

34. The method of claim 33 further comprises:

receiving default data parameters from the onboard memory, wherein the default data parameters correspond to the at least one onboard system requiring a higher user security level than the reduced user security level for the identified user;

applying the default data parameters to the at least one onboard systems; and modifying functions of the at least one of onboard system in accordance with the default data parameters.

* * * * *

UNITED STATES PATENT AND TRADEMARK OFFICE
CERTIFICATE OF CORRECTION

PATENT NO. : 6,198,996 B1
DATED : March 6, 2001
INVENTOR(S) : Berstis

It is certified that error appears in the above-identified patent and that said Letters Patent is hereby corrected as shown below:

Column 11,
Line 23: "enables" should be -- enabled --.

Column 14,
Line 13: "Loan" should be -- "Load --".

Column 15,
Line 8: "SmartCart" should be -- "SmartCard --".

Column 24,
Line 4: "on" should be --one--.
Line 11: "method" should be -- system --.
Line 14: "method" should be -- system --.
Line 19: "method" should be -- system --.
Line 19: add -- means -- after "authorizing.
Line 38: "method" should be -- system --.
Line 42: "method" should be -- system --.
Line 45: "method" should be -- system --.
Line 49: "method" should be -- system --.

UNITED STATES PATENT AND TRADEMARK OFFICE
CERTIFICATE OF CORRECTION

PATENT NO. : 6,198,996 B1
DATED : March 6, 2001
INVENTOR(S) : Berstis

It is certified that error appears in the above-identified patent and that said Letters Patent is hereby corrected as shown below:

<u>Column 25,</u>
Line 14: add --the-- after "with".
Line 29: delete "p1" before "instructions".

Signed and Sealed this

Fourteenth Day of August, 2001

*Attest:*

*Attesting Officer*

NICHOLAS P. GODICI
*Acting Director of the United States Patent and Trademark Office*